US012736654B2

(12) United States Patent
Zhang et al.

(10) Patent No.: US 12,736,654 B2
(45) Date of Patent: Sep. 15, 2026

(54) MILLIMETER-WAVE MASSIVE MIMO FMCW RADAR WITH BINARY-PHASE-CODED OFDM

(71) Applicant: Northeastern University, Boston, MA (US)

(72) Inventors: Weite Zhang, Malden, MA (US); Jose Angel Martinez-Lorenzo, Wellesley, MA (US)

(73) Assignee: Northeastern University, Boston, MA (US)

( * ) Notice: Subject to any disclaimer, the term of this patent is extended or adjusted under 35 U.S.C. 154(b) by 299 days.

(21) Appl. No.: 18/569,505

(22) PCT Filed: Jun. 23, 2022

(86) PCT No.: PCT/US2022/073109

§ 371 (c)(1), (2) Date: Dec. 12, 2023

(87) PCT Pub. No.: WO2023/015067

PCT Pub. Date: Feb. 9, 2023

(65) Prior Publication Data

US 2024/0280682 A1 Aug. 22, 2024

Related U.S. Application Data

(60) Provisional application No. 63/215,202, filed on Jun. 25, 2021.

(51) Int. Cl.
*G01S 13/48* (2006.01)
*G01S 13/89* (2006.01)
(Continued)

(52) U.S. Cl.
CPC .............. *G01S 13/48* (2013.01); *G01S 13/89* (2013.01); *H04B 1/0003* (2013.01); *H04B 7/0413* (2013.01)

(58) Field of Classification Search
CPC .......... G01S 7/006; G01S 7/023; G01S 7/282; G01S 13/48; G01S 13/89; H04L 25/00;
(Continued)

(56) References Cited

U.S. PATENT DOCUMENTS 10,110,297 B2 * 10/2018 Rieth ................ H04B 7/18506
10,261,179 B2 * 4/2019 Davis ..................... G01S 13/87
(Continued)

FOREIGN PATENT DOCUMENTS

WO 2020016879 A1 1/2020
WO 2021090285 A2 5/2021
WO 2023015067 A2 2/2023

OTHER PUBLICATIONS

Marinho, D. etal., "Software-Defined Radio Beamforming System for 5G/Radar Applications," Applied Sciences, 10, 7187, 14 pages (2020). (Year: 2020).*

(Continued)

*Primary Examiner* — Peter M Bythrow
(74) *Attorney, Agent, or Firm* — Hamilton, Brook, Smith & Reynolds, P.C.

(57) ABSTRACT

A multiple-input-multiple-output (MIMO) radar system comprises two or more software-defined millimeter-wave (SDMMW) nodes, a host processing system that is electrically coupled to the two or more SDMMW nodes, and a MIMO aperture array coupled to the two or more SDMMW nodes. The MIMO radar system is configured to form a MIMO TX channel and a MIMO RX channel for each of the two or more SDMMW nodes. The MIMO radar system includes a millimeter wave (MMW) frequency-modulated continuous wave (FMCW) oscillator source configured to generate a MMW FMCW signal. For each of the two or more SDMMW nodes, the radar system includes an upconverter assembly and a downconverter assembly.

20 Claims, 29 Drawing Sheets

(51) Int. Cl.
*H04B 1/00* (2006.01)
*H04B 7/0413* (2017.01)

(58) Field of Classification Search
CPC ................. H04L 27/00; H04L 25/0202; H04L 25/022; H04L 27/26132; H04L 27/2647; H04L 5/0007; H04L 5/0048; H04L 5/0098; H04L 5/14; H04B 1/0003; H04B 1/707; H04B 7/2643; H04B 7/0413
See application file for complete search history.

(56) References Cited

U.S. PATENT DOCUMENTS 11,061,126 B2* 7/2021 Ray ..................... H04L 27/3863
11,086,010 B2* 8/2021 Davis ...................... G01S 7/023
11,555,916 B2* 1/2023 Reynolds ................ G01S 13/89
12,476,848 B2* 11/2025 Kim .................... H04L 27/2607
2007/0263748 A1* 11/2007 Mesecher ............ H01Q 3/2611 375/299
2011/0193739 A1* 8/2011 Strauch ............... H04L 27/2647 342/146
2013/0002488 A1* 1/2013 Wang ...................... G01S 13/89 342/368
2017/0293025 A1* 10/2017 Davis .................... G01S 7/0233
2018/0203095 A1* 7/2018 Xie ......................... G01S 7/023
2020/0174098 A1* 6/2020 Lang ..................... G01S 7/4008
2020/0319327 A1* 10/2020 Tsvelykh .............. G01S 13/933
2021/0167996 A1* 6/2021 Ratnam ................ H04B 7/0617
2022/0224380 A1* 7/2022 Lee .................... H04B 7/06952

OTHER PUBLICATIONS

Molaei, A. et al., "Chapter 3: Compressive Reflector Antenna Phased Array," Antenna Arrays and Beam Formation, Rijeka: InTech, 2017. (Year: 2017).*
International Search Report and Written Opinion for Int'l Application No. PCT/US2022/073109, Date of Mailing: Apr. 13, 2023.
Marinho, D. et al., "Software-Defined Radio Beamforming System for 5G/Radar Applications," Applied Sciences, 10, 7187, 14 pages (2020).
Molaei, A. et al., "Chapter 3: Compressive Reflector Antenna Phased Array," Antenna Arrays and Beam Formation, Rijeka: InTech, 2017.

* cited by examiner

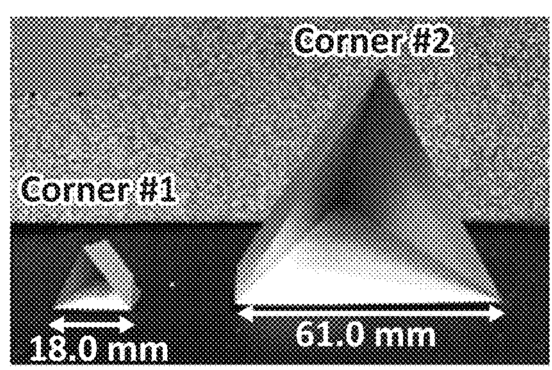
FIG. 12A
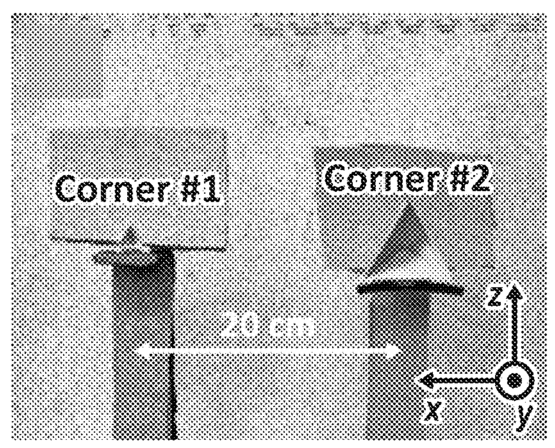
FIG. 12B
FIG. 12C
FIG. 12D
FIG. 12E
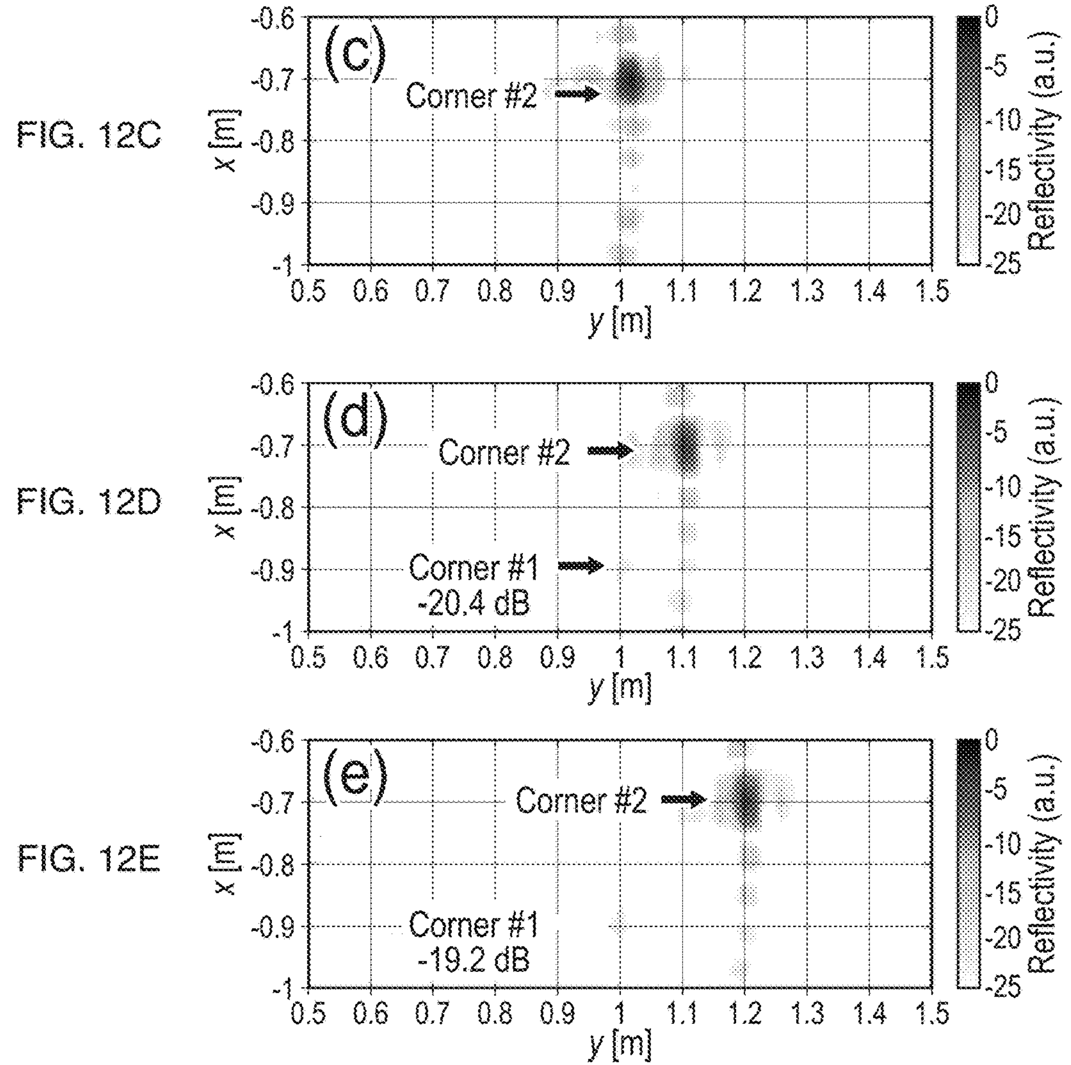

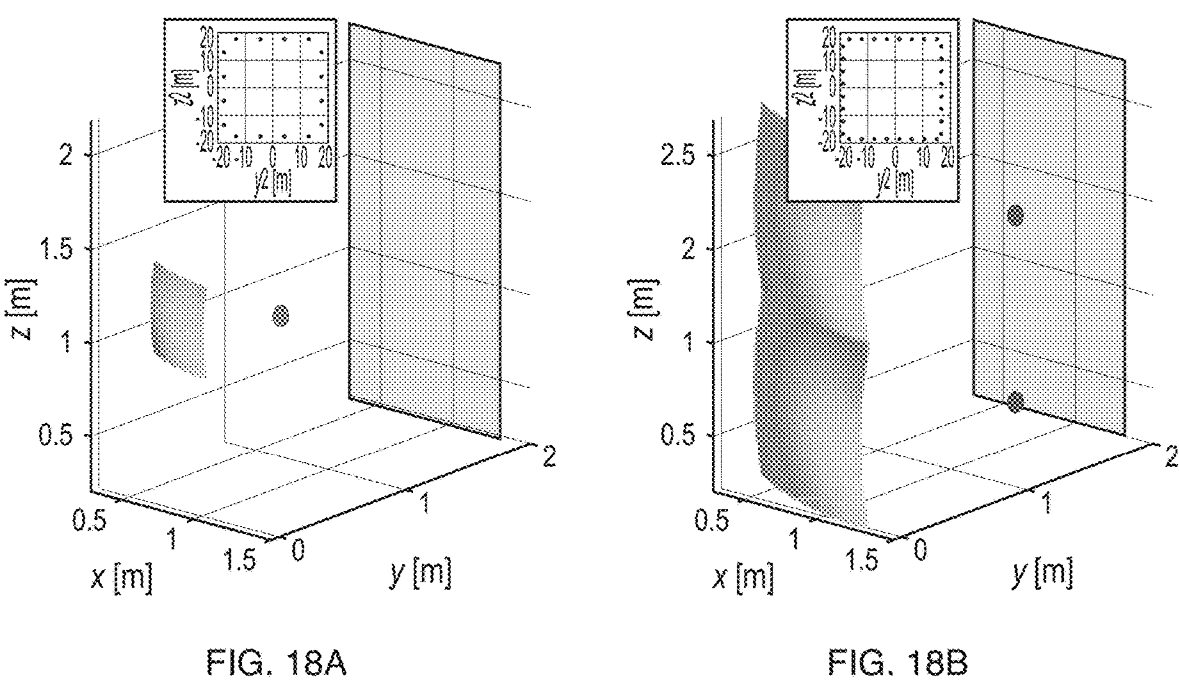
FIG. 18A
FIG. 18B
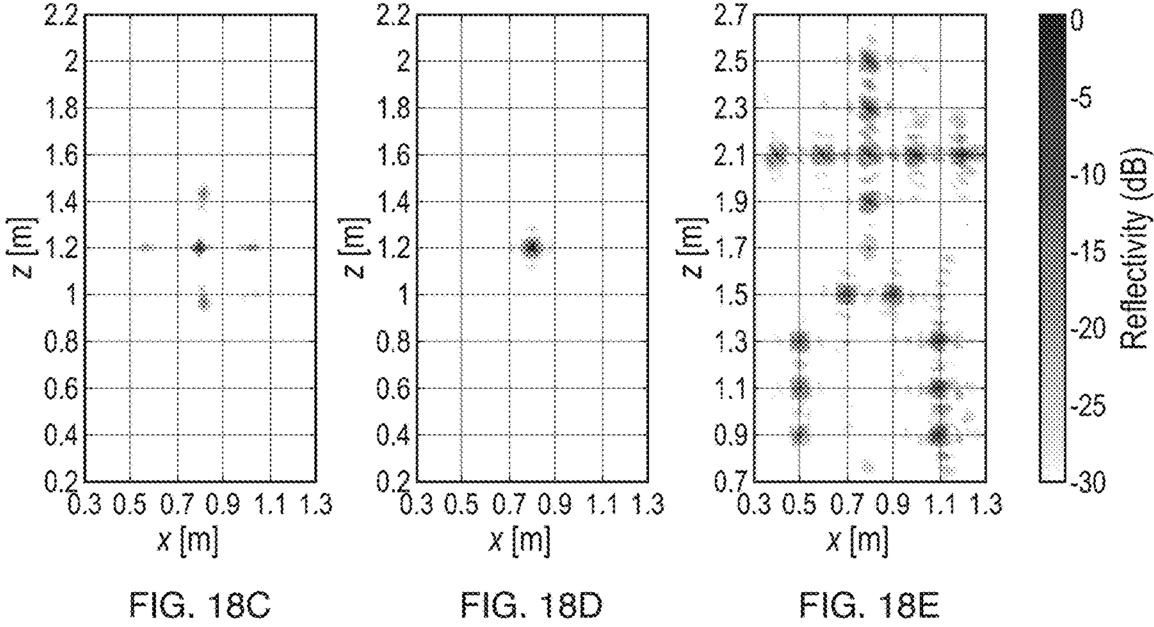
FIG. 18C
FIG. 18D
FIG. 18E

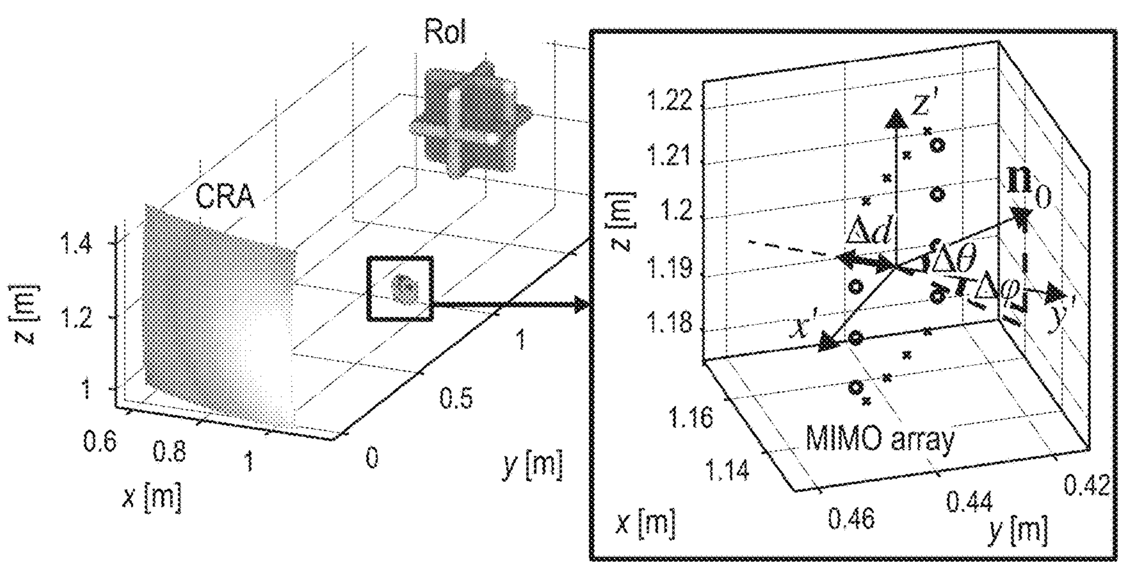
FIG. 19A
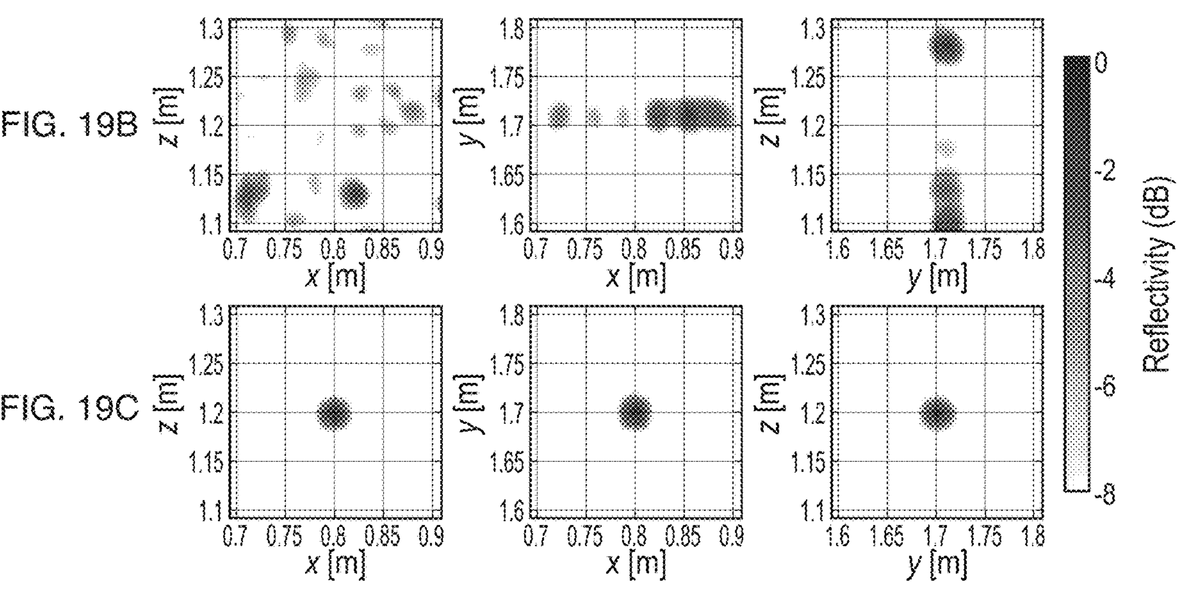
FIG. 19B
FIG. 19C

L-shaped object
2302
32cm
112cm
80cm
CRA
2304
x
y
z
SDMMW MIMO
Txs
Rxs
Rxs
Txs
Linear actuator

MILLIMETER-WAVE MASSIVE MIMO FMCW RADAR WITH BINARY-PHASE-CODED OFDM

RELATED APPLICATIONS

This application is the U.S. National Stage of International Application No. PCT/US2022/073109, filed on Jun. 23, 2022, which designates the U.S., published in English, and claims the benefit of U.S. Provisional Application No. 63/215,202, filed on Jun. 25, 2021. The entire teachings of the above applications are incorporated herein by reference.

GOVERNMENT SUPPORT

This invention was made with government support under Grant Number 1653671 awarded by the National Science Foundation. The government has certain rights in the invention.

BACKGROUND

Conventional millimeter-wave (mm-wave) multiple-in-multiple-out (MIMO) radars often use time-division multiplexing or frequency-division multiplexing to image targets, where only one transmitter (Tx) is enabled at the same time and frequency. Such multiplexing methods can lead to a relatively low receiving signal-to-noise ratio (SNR) or a long image formation time. Recent radars explore to use more advanced multiplexing schemes with more complicated waveforms to gain a better imaging performance. One approach is the space-time coding to achieve simultaneous MIMO transmission/reception, which gives rise to a higher receiving SNR and faster image formation rate. Another approach is using the orthogonal frequency-division multiplexing (OFDM), which can increase the spectral efficiency of the radar system where more measurement samples per frequency bandwidth are achieved. Nevertheless, as the complexity of radar waveforms increases, conventional radar systems inevitably suffer from a higher hardware design complexity and cost.

Software defined radios (SDRs) have been widely used in wireless network and communication systems, and are available at a relatively low cost due to their commercialization. SDRs have recently been used in mm-wave radars for sensing and imaging applications. The use of SDRs in radars can enable arbitrary waveform multiplexing in software, which immensely reduces the radar hardware design complexity and cost. However, commercial SDRs typically have a low frequency bandwidth due to the limited speed of the AD/DA (analog-to-digital/digital-to-analog) converters, and radar systems with SDRs do not have the capability to achieve large and dense MIMO front-ends. Thus, three-dimensional (3D) imaging with a high resolution at the mm/cm level is not realistic in current SDR radars.

SUMMARY

Example embodiments of the invention, as described herein, include methods and systems for software-defined millimeter-wave (SDMMW) massive multiple-input-multiple-output (MIMO) radar, which facilitate high-resolution three-dimensional (3D) imaging with a low hardware design complexity and cost. The described embodiments make use of software-defined baseband circuits (either customized or commercial) with a coherently distributed mm-wave frequency-modulated continuous wave (FMCW) oscillator source, which enables a wide frequency bandwidth sweeping over multiple gigahertz (GHz), while retaining a relatively low-speed baseband AD/DA sampling rate at multiple megahertz (MHz). The described embodiments enable arbitrary efficient radar waveforms, including (but not limited to) orthogonal frequency-division multiplexing (OFDM), space-time coding, and transmitting/receiving digital beamforming. Embodiments may achieve a video-like image formation and a high receiving signal-to-noise ratio (SNR).

The hardware of an example embodiment mainly comprises three parts: (i) a host processor, (ii) multiple SDMMW nodes, and (iii) the functionality and massive MIMO array.

The host processor executes software to modulate/demodulate digital baseband waveforms in the transmission/reception mode, and performs the imaging reconstruction to visualize targets in 3D.

The multiple SDMMW transceiver nodes operate in a transmission mode and a reception mode. In the transmission mode, the multiple SDMMW transceiver nodes take in the digital baseband waveform samples and modulate them on the wide-band mm-wave FMCW. In the reception mode, the multiple SDMMW nodes receive the reflected and coupled mm-wave FMCW signal from the imaging domain and convert it into the digital baseband waveform samples. Data streaming between the SDMMW transceiver nodes and the host processor is conveyed through a high-throughput digital interface which may include (but is not limited to) Universal Serial Bus (USB), Ethernet, Peripheral Component Interconnect express (PCI-e), among others.

A massive MIMO array is used to convert the mm-wave FMCW signal to electromagnetic radiation in the transmission mode, or capture the reflected electromagnetic radiation from the imaging domain in the reception mode. The massive MIMO array can be flexibly arranged to achieve an efficient spatial sampling, such as those in plus (i.e., +) or rectangular shapes.

The software executed by the host processor in an example embodiment coordinates all the hardware components and performs the digital baseband processing for 3D image formation in real-time. The functionalities of the software subsystem may include 1) time synchronization between all SDMMW transceiver nodes, 2) measurement trigger and data streaming, 3) digital baseband waveform modulation/demodulation, and 4) imaging reconstruction to visualize targets in 3D.

The embodiments of the invention can be either integrated on printed-circuit boards, or implemented by cascading commercial (or customized) components in a modularized fashion. In one embodiment, the radar hardware is modularized and designed to use space-time coding (STC) with OFDM waveforms. The STC is specifically implemented by applying various orthogonal binary phase coding (BPC) on the OFDM symbol sequences in the transmitting chains. In another embodiment, the same modularized radar may be used to perform transmitting and receiving digital beamforming with OFDM waveforms.

The described embodiments facilitate high-resolution three-dimensional imaging implemented by cost-effective software-defined millimeter-wave massive MIMO. The software-based efficient radar waveforms may include, but are not limited to, orthogonal frequency-division multiplexing, spacetime coding, and transmitting and receiving digital beamforming. The described embodiments support wide frequency bandwidth sweeping over multiple GHz and a relatively low-speed baseband analog-to-digital converter (ADC) and digital-to-analog (DAC) sampling rate using commercial software-defined radios and a FMCW oscillator.

The described embodiments may provide video-like image formation and a high receiving signal-to-noise ratio. Efficient MIMO measurements may be achieved by using the described BPC-OFDM waveforms, where all the Txs and Rxs can operate at the same time and the same frequency. Software-defined radios are used in the described embodiments to perform the modulation/demodulation of the BPC-OFDM waveforms at digital baseband, without the need to use analog phase shifters. The use of modularized radar hardware components is a cost-effective way to achieve massive MIMO channels for high resolution imaging applications, as compared to the integrated design on a single printed circuit board (PCB). Customized software (processor instruction code) coordinates the hardware modules to perform 3D imaging at a video rate.

Example embodiments of the invention may include methods and systems for software-defined millimeter-wave (SDMMW) MIMO imaging. An example embodiment mainly comprises software-defined baseband circuits with a relatively low baseband sampling rate, and a coherently distributed mm-wave frequency-modulated continuous wave (FMCW) oscillator source to extend the frequency bandwidth to increase the imaging resolution. Such a hardware architecture allows a high-resolution three-dimensional (3D) imaging with a low system design complexity and cost. One embodiment of this invention can be built by using commercially available components, where most of the hardware components have been widely used in conventional wireless communication systems and can be obtained on low prices.

Modern MIMO radars use advanced waveforms such as space-time coding and orthogonal frequency-division multiplexing (OFDM) to achieve simultaneous MIMO transmission/reception for better imaging performance. However, as the complexity of those waveforms increases, those radar systems inevitably suffer from a high hardware complexity and design cost. Software defined radios (SDRs) can ease the modulation/demodulation of those waveforms by performing digital signal processing in software. However, commercial SDR platforms always have relatively low frequency bandwidth since the implementation of high-speed analog-to-digital converters (ADCs) and digital-to-analog converters (DACs) are costly and complicated. Thus, high-resolution three-dimensional (3D) imaging can hardly be achieved in current SDR radars.

Example embodiments further include methods and systems for software-defined millimeter-wave (SDMMW) MIMO imaging, which allows high-resolution 3D imaging with a low system design complexity and cost. The embodiments can enable a wide frequency bandwidth sweeping over multiple GHz, while retaining a relatively low-speed baseband ADC/DAC sampling rate within multiple MHz. The embodiments can achieve various efficient radar waveforms, including, but not limited to, OFDM, space-time coding, and digital beamforming. Example embodiments of the invention can achieve a video-like image formation and a high receiving signal-to-noise ratio (SNR), especially when using transmitting and receiving digital beamforming.

The described embodiments may include a BPC-OFDM waveform that is configured to achieve the MIMO diversity gain and increase the system spectral efficiency for a better imaging performance, which is more efficient compared to conventional radars using time/frequency division multiplexing. The described embodiments demonstrate a higher receiving SNR that is obtained compared to that in conventional radar systems using time/frequency division multiplexing. The described embodiments utilize simple linear channel estimation algorithm that is developed for the BPC-OFDM demodulation to retrieve the measurement vector for the imaging reconstruction.

The described embodiments demonstrate a modularized radar hardware design that is a more cost-effective way to achieve massive MIMO channels for high resolution imaging applications compared to the integrated design on a single printed circuit board (PCB). Modularized design is also much easier to test, repair, or replace an individual module in the system. Additionally, software-defined radios have been widely used in radio communication systems and are commercially available at a low price.

Efficient MIMO measurements are achieved by using the designed BPC-OFDM waveforms, where all the Txs and Rxs can operate at the same time and the same frequency. A higher receiving SNR is obtained compared to that in conventional radar systems using time/frequency division multiplexing.

The described embodiments may be used, for example, in association with (i) high-resolution real-time people screening, (ii) millimeter-wave wireless communication/networks, (iii) automotive driving and collision avoidance systems, (iv) software defined radios, (v) FMCW oscillators, (vi) millimeter-wave mixers, (vii) millimeter-wave antennas, (viii) millimeter-wave wireless communication/networks, (ix) beamforming based millimeter-wave wireless communication/network, and (x) non-contact and non-invasive signal monitoring.

In one aspect, the invention may be a multiple-input-multiple-output (MIMO) radar system, comprising two or more software-defined millimeter-wave (SDMMW) nodes, a host processing system electrically coupled to the two or more SDMMW nodes, and a MIMO aperture array coupled to the two or more SDMMW nodes. The MIMO radar system may form a MIMO transmit (TX) channel and a MIMO receive (RX) channel for each of the two or more SDMMW nodes.

In an embodiment, the MIMO radar system may further comprise a millimeter wave (MMW) frequency-modulated continuous wave (FMCW) oscillator source configured to generate a MMW FMCW signal. For each of the two or more SDMMW nodes, the MIMO radar system may further comprise an upconverter assembly configured to receive a transmit (TX) intermediate frequency (IF) signal from the SDMMW node, convert the TX IF signal to a TX millimeter wave (MMW) signal using the MMW FMCW signal, and provide the TX MMW signal to the MIMO array. For each of the two or more SDMMW nodes, the MIMO radar system may further comprise a downconverter assembly configured to receive a receive (RX) MMW signal from the MIMO array, convert the RX MMW signal to an RX IF signal using the MMW FMCW signal, and provide the RX IF signal to the SDMMW node.

The MMW FMCW oscillator source may coherently distribute the MMW FMCW signal to each of the two or more SDMMW nodes. The MMW FMCW oscillator source may sweep the MMW FMCW signal across a range of frequencies. The range of frequencies may be continuous. The range of frequencies may comprise discrete steps.

Each of the two or more SDMMW nodes may implement an orthogonal frequency-division multiplexing (OFDM) waveform. Each of the two or more SDMMW nodes may implement space-time coding. Each of the two or more SDMMW nodes may implement transmission and reception digital beamforming The host processing system may comprise a processor and a memory with computer code instructions stored thereon.

The memory may be operatively coupled to the processor such that, when executed by the processor, the computer code instructions cause the host processing system to (i) modulate/demodulate one or more digital baseband waveforms in a transmission/reception mode, and (ii) perform imaging reconstruction of information received through a receive channel to visualize targets in 3D.

The two or more software-defined millimeter-wave (SDMMW) nodes may be configured to operate in a transmission mode and a receive mode. The MIMO radar system may further comprise a compressive reflector antenna (CRA) constructed and arranged to (i) reflect a transmit MMW signal, radiated by the MIMO array, towards a target, and (ii) reflect a receive MMW signal, radiated by the target, towards the MIMO array. The receive MMW signal that is radiated by the target may be the transmit MMW signal that has been reflected by the target. The MIMO radar system may further comprise at least one additional CRA constructed and arranged to reflect the transmit MMW signal and to reflect the receive MMW signal.

The MIMO radar system may further comprise a clock distributer module that (i) distributes a frequency reference to the two or more SDMMW nodes, the MMW FMCW oscillator source, and the host processor, and (ii) distributes a timing reference to the two or more SDMMW nodes, the MMW FMCW oscillator source, and the host processor. The timing source may (i) trigger the MMW FMCW oscillator source to sweep the MMW FMCW signal across a range of frequencies, and (ii) trigger the two or more SDMMW nodes to begin data streaming in all transmit (TX) and receive (RX) channels. The data streaming may comprise, at each of a set of MMW FMCW signal frequencies across the range of frequencies, a transmission of orthogonal binary phase coding (BPC) on the orthogonal frequency-division multiplexing (OFDM) symbol sequences The MIMO radar system may be calibrated by a measurement of, and a compensation of, phase and magnitude errors in each of the MIMO TX channels and MIMO RX channels.

The MIMO radar system of claim 17, wherein measurement of and a compensation of phase and magnitude errors is performed using a calibrated measurement vector $$\tilde{g} = (g - g_{BG}) \cdot \left( \frac{g_{C-SIM}}{g_{C-EXP} - g_{BG}} \right),$$

where $g_{BG}$ is a background measurement absent any object in front of the radar system, $g_{C-EXP}$ is a measured response at a far-field of the MIMO array, $g_{C-SIM}$ is a simulated response of the radar system, and g is any raw measurement vector before calibration.

Each of the two or more SDMMW nodes may use coding on an orthogonal frequency-division multiplexing (OFDM) waveform, with distinct coding applied to each TX path, to distinguish data returning on each RX path. The coding may be space-time coding (STC).

BRIEF DESCRIPTION OF THE DRAWINGS

The foregoing will be apparent from the following more particular description of example embodiments, as illustrated drawings interspersed herein. The drawings are not necessarily to scale, emphasis instead being placed upon illustrating embodiments.

FIG. 12A shows the two corner reflectors used for the measurements.

FIG. 12B shows the calibration setup to image the two corner reflectors separated by 20 cm in the cross-range.

FIGS. 12C, 12D, and 12E show the two dimensional (2-D) reconstructed profiles along the range and cross-range.

FIG. 18A shows a basic simulation setup with the 0.5 m-by-0.5 m CRA fed by the 8-by-8 MIMO array where the element separation is 9.0 mm.

FIG. 18B shows a more advanced simulation setup by stacking two 1.0 m-by-1.0 m CRAs in a multistatic configuration.

FIG. 18C shows the simulated PSF of the 0.5 m-by-0.5 m CRA fed by the 8-by-8 array.

FIG. 18D shows the PSF of the 1.0 m-by-1.0 m CRA fed by the 16-by-16 array.

FIG. 18E shows the simulated performance to image a human-size array of points using the setup in FIG. 18B.

FIG. 19A shows an example simulation setup.

FIGS. 19B and 19C show the simulated PSFs before and after the calibration, respectively.

DETAILED DESCRIPTION

A description of example embodiments follows.

Figure 1:
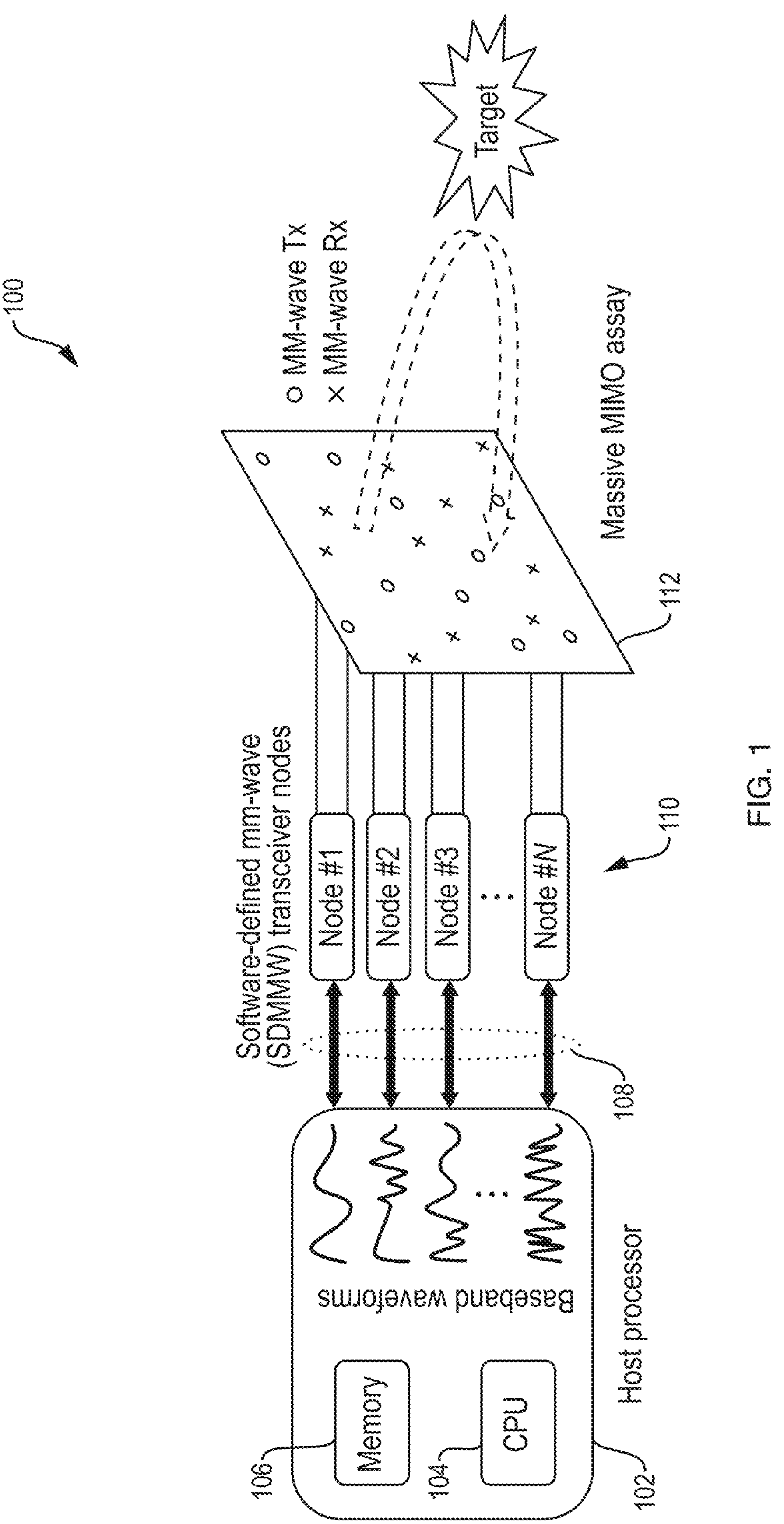
FIG. 1 shows the general configuration of a massive MIMO radar system, according to the invention.

FIG. 1 shows the general configuration of a massive MIMO radar system 100, according to an example embodiment of the invention. The MIMO radar system 100 comprises a host processor 102, multiple software-defined millimeter-wave (SDMMW) transceiver nodes 110, and a massive MIMO array 112. The host processor 102 executes software to perform arbitrary digital baseband waveform modulation/demodulation and the imaging reconstruction. The host processor 102 may comprise a central processing unit (CPU) 104 and memory 106. The memory 106 stores the software executed by the CPU 104 to perform the digital signal processing, as well as cache the raw digital waveform samples in the transmitting/receiving mode. The memory 106 may include random-access memory (RAM), and may also include a secondary memory, such as a hard disk drive and/or solid-state drive (SSD) and/or a removable storage drive. The host processor 102 may have a high-throughput baseband digital interface 108 to all the SDMMW transceiver nodes 110. The digital interface 108 may be implemented by, for example, universal serial bus (USB), ethernet, peripheral component interconnect express (PCI-e), among others.

The SDMMW transceiver nodes 110 includes N transmitters (Txs) and N receivers (Rxs). In transmission mode, SDMMW transceiver nodes 110 receive digital waveform samples from the host processor 102 and modulate the samples on the mm-wave frequency-modulated continuous wave (FMCW) signal with a wide frequency bandwidth. In reception mode, the SDMMW transceiver nodes 110 accept the received mm-wave FMCW signal from the massive MIMO array 112 and convert it into digital waveform samples, which are streamed to the host processor 102 for digital signal processing by the software.

Figure 2:
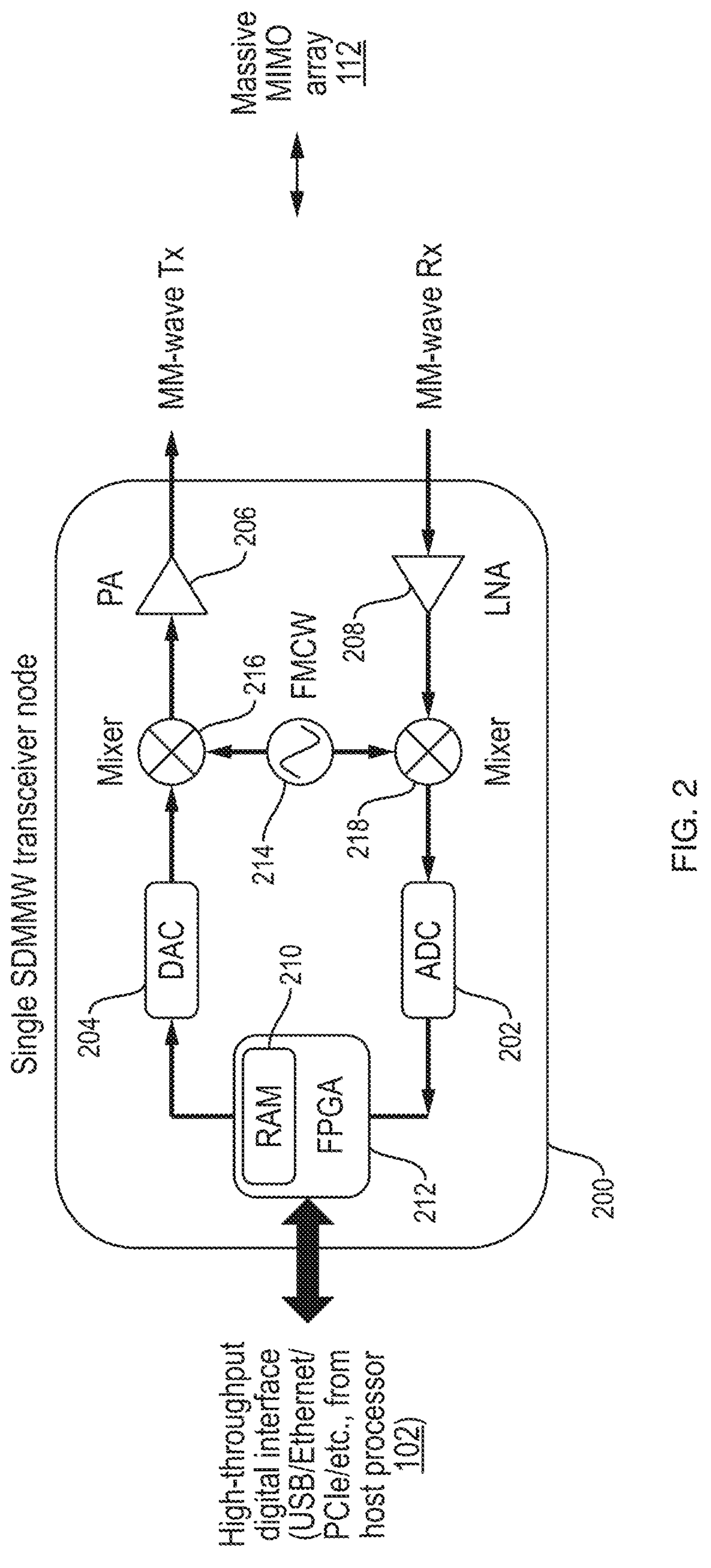
FIG. 2 shows a detailed diagram of a single SDMMW transceiver node, according to the invention.

A detailed diagram of a single SDMMW transceiver node 200 is shown in FIG. 2. The massive MIMO array 112 converts the mm-wave FMCW signal to electromagnetic radiation in the transmission mode, or captures the reflected electromagnetic radiation from the imaging domain and converts it to the mm-wave FMCW signal in the reception mode. The massive MIMO array may be flexibly arranged to achieve an efficient spatial sampling, such as those in plus or rectangular shapes.

A detailed hardware block diagram of a single SDMMW transceiver node 200 is shown in FIG. 2. ADC 202 is an analog-to-digital converter, DAC 204 is a digital-to-analog converter, PA 206 is a power amplifier, LNA 208 is a low noise amplifier, RAM 210 is random-access memory, and FPGA 212 is a field-programmable gate array. In example embodiments, the SDMMW transceiver node 200 may be integrated on one or more printed-circuit boards, or alternatively implemented by cascading commercial (or customized) components in a modularized fashion.

In the transmission mode, the FPGA 212 takes in arbitrary baseband waveform samples provided by the high-throughput digital interface that is connected to the host processor 102. Those digital waveform samples are saved in the RAM 210 and then converted to the analog baseband signal by the DAC 204. The analog baseband signal may have relatively narrow bandwidth dependent on the speed of DAC 204, typically in multiple MHz. The analog baseband signal may be directly mixed with the FMCW source 214 that sweeps over a wide mm-wave bandwidth, typically in multiple GHz. The FMCW sweeping can be either stepped or continuous. The swept FMCW signal is modulated with the output of the DAC 204 through an upconverter mixer 216. The resulting output modulated mm-wave FMCW signal is amplified by PA 206 and provided to the Tx antenna for electromagnetic radiation. Note that, in some cases, the analog baseband signal may be up-converted several times (using multiple mixers) to achieve a higher-frequency mm-wave output.

In the receiving mode, a signal demodulation sequence is performed reversely, which can be viewed as the reciprocity of that in the Tx channel: a receive antenna captures the reflected electromagnetic radiation from the imaging domain. The radiation is converted to the mm-wave FMCW signal, amplified by the LNA 208 and fed into a downconverter mixer 218. The output of the downconverter mixer 218 is the analog baseband signal that is digitized by the ADC 202 into the digital baseband samples. Those samples are streamed back to the memory 106 of the host processor 102 through the high-throughput digital interface 108. Note that, in some cases, the mm-wave FMCW signal may be down-converted multiple times (using multiple mixers) to retrieve the analog baseband signal.

Figure 3:
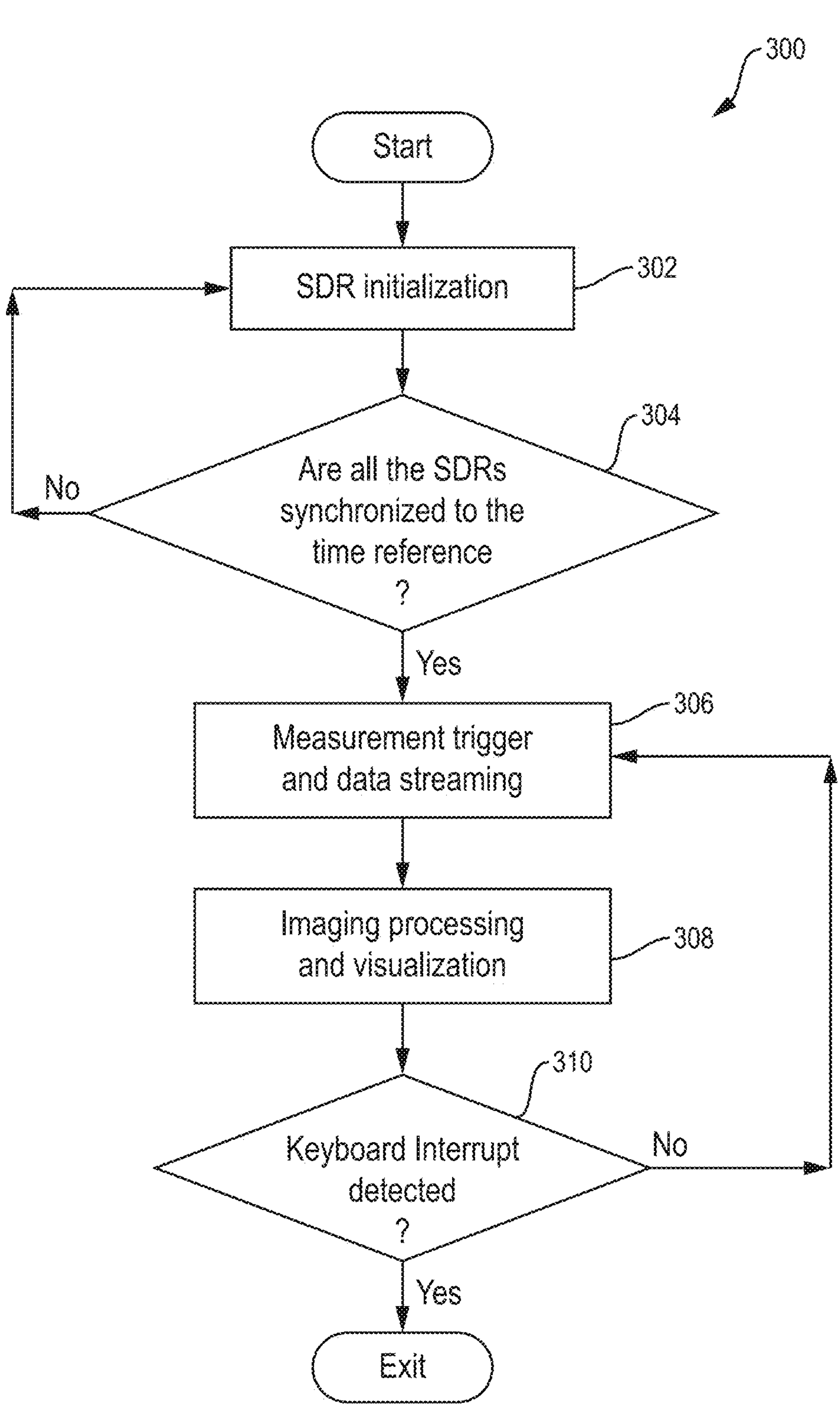
FIG. 3 shows the execution flowchart of software used in an example embodiment of the invention to coordinate all the radar hardware for the 3D imaging in real-time.

FIG. 3 shows the execution flowchart 300 of software used in an example embodiment of the invention to coordinate all the radar hardware for the 3D imaging in real-time. In the software defined radio (SDR) initialization step 302, the host processor performs at least the following actions: 1) initialize the time register associated with each SDMMW transceiver node at the arrival of the falling edge of the time reference; 2) generate (or modulate) the digital baseband waveform samples for each Tx channel and save them into the memory; and 3) establish the memory address associated with each Rx channel for received digital baseband waveform samples to be saved in the future.

After the first SDR initialization 302, the software (as used herein, 'software' refers to processor-executed instruction code) may determine 304 if all the SDMMW transceiver nodes are fully synchronized by reading and comparing the values in the time registers associated with the SDMMW transceiver nodes. The software script keeps checking until all the time registers associated with SDMMW transceiver nodes contain a same time stamp. Once synchronized, all the MIMO channels including Tx and Rx channels wait for the arrival of the falling (or rising) edge to trigger the data streaming 306. The digital signal processing, including baseband waveform demodulation and imaging reconstruction, will automatically start after the data streaming. The software continues triggering for the next measurement such that the radar operates continuously, and the processor performs image processing 308 and produces a video-like representation of the targets in 3D. A user may input a keyboard interrupt 310 to stop or pause the image processing and visualization 310 when necessary or desired.

Figure 4A:
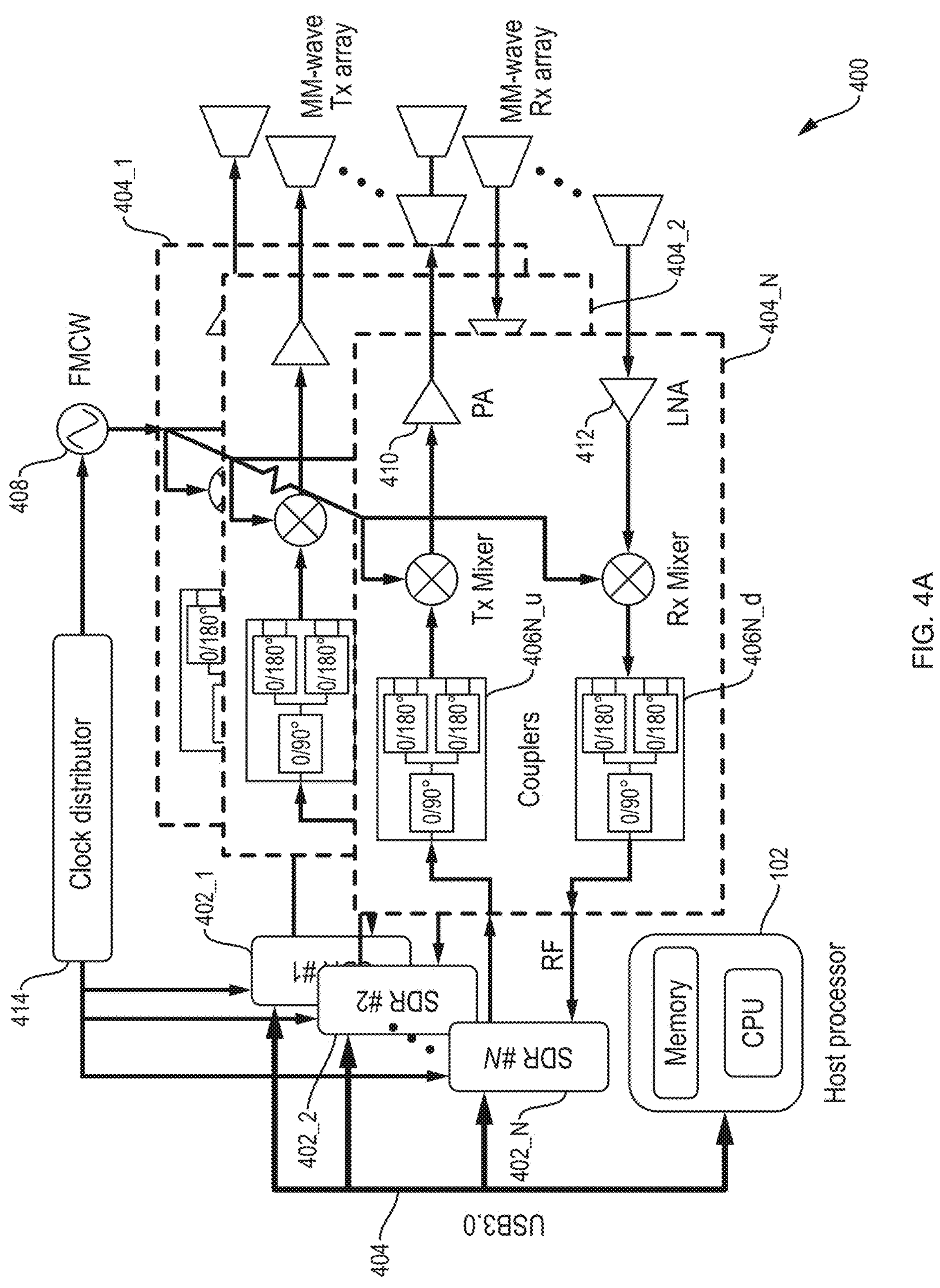
FIG. 4A shows an example embodiment of the massive MIMO radar system.
Figure 4B:
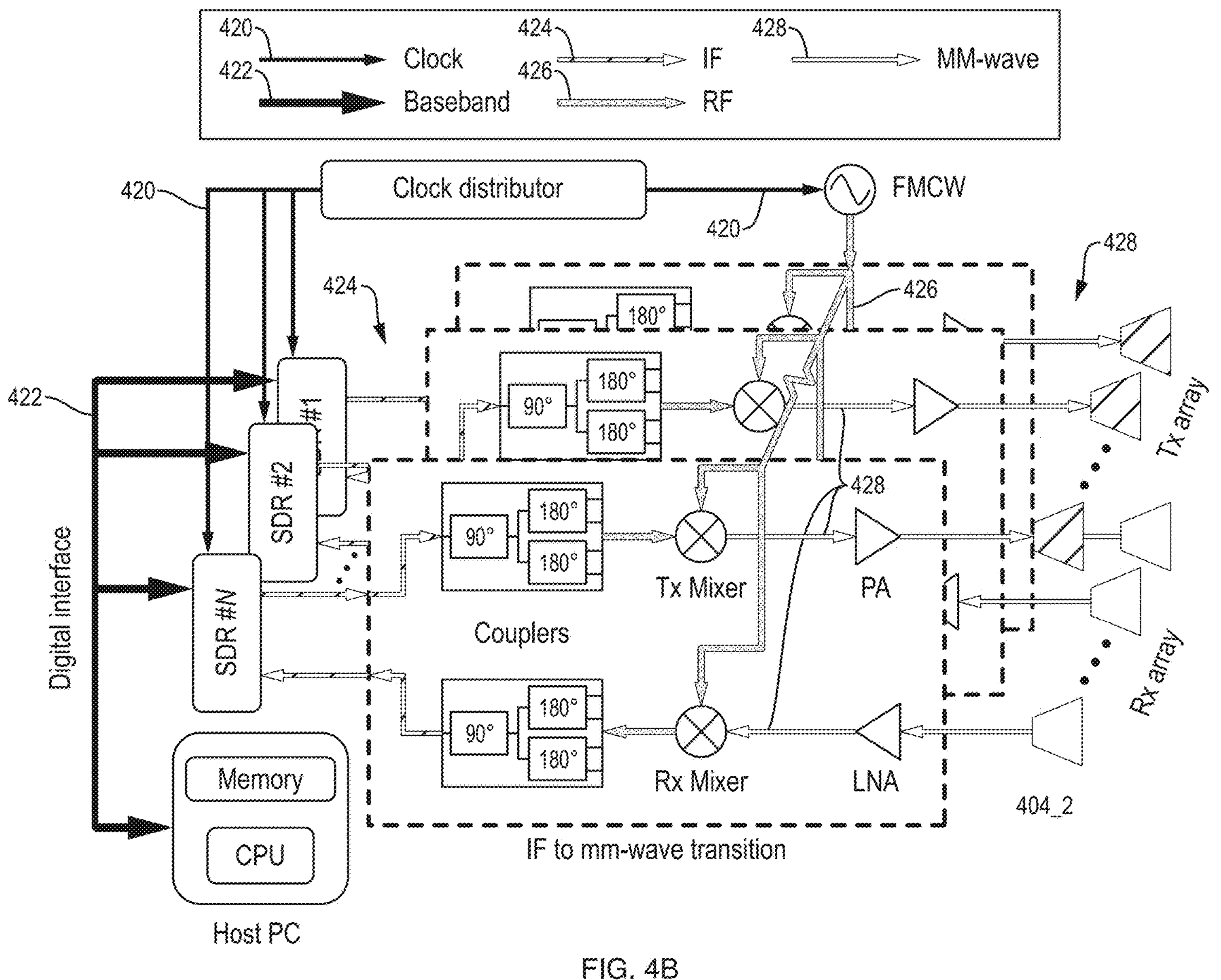
FIG. 4B shows the example embodiment depicted in FIG. 4A with various signal groups identified.

FIG. 4A shows an example embodiment of the massive MIMO radar system 400. FIG. 4B shows the example embodiment depicted in FIG. 4A with various signal groups identified (e.g., clock signals 420, baseband signals 422, IF signals 424, RF signals, and mm-wave signals). In this embodiment, the SDMMW transceiver nodes 200 (as depicted in FIG. 2) are partitioned into (i) a software-defined radio (SDR) portion 402_1, 402_2 . . . 402_N, and (ii) up/down conversion modules 404_1, 404_2 . . . 404_N. The entire massive MIMO radar system 400 may be modularized, and may utilize commercial and/or customized components. The SDMMW transceiver nodes 402_1 . . . 402_N may be acquired commercially at a relatively low price. In this embodiment, the radar waveform makes use of orthogonal binary phase coding (BPC) sequences to implement space-time-coding on the orthogonal frequency-division multiplexing (OFDM) symbols. The radar waveform makes use of OFDM to increase the system spectral efficiency for a better imaging performance. The transmission and reception paths are described herein using the $N^{th}$ SDMMW transceiver node channel as a representative channel.

For the transmission channel, referring to the $N^{th}$ transceiver node in FIG. 4A, the host processor 102 first generates the BPC-OFDM waveform samples for the $N^{th}$ Tx channel, and saves the waveform samples in the memory 106. The waveform samples are then sent to the $N^{th}$ SDR 402_N through an interface 404 (e.g., USB 3.0 or other protocol). The SDR 402_N generates the BPC-OFDM waveforms on a radio frequency (RF) carrier, and provides the modulated RF carrier signal to the up/down conversion module 404_N. The RF signal then passes through a single-to-differential converter 406N_u that, in one embodiment, includes one 90-degree coupler and two 180-degree couplers. While other embodiments may not utilize the single-to-differential converter described herein, its use in the example embodiment may make the radar system more robust to the thermal drift and the electromagnetic noise interference. The differential outputs are then provided to the Tx mixer that also receives a coherently distributed signal from the FMCW source 408. The mm-wave FMCW signal output from the Tx mixer is amplified by a power amplifier (PA) 410 before being provided to the Tx antenna for electromagnetic radiation.

In the corresponding reception channel, the Rx antenna captures the mm-wave signal reflected from the imaging domain. The received mm-wave signal is first fed into a lower-noise-amplifier (LNA) 412, and the amplified signal is down-converted to an RF waveform by the Rx mixer where the coherent FMCW source is used. The output RF waveform passes through another single-to-differential converter, which can be viewed as a reciprocity of the single-to-differential converter in the Tx channel. The single-ended RF output is then down-converted and digitized by the $N^{th}$ SDR 402_N into baseband samples, which represents the coupled and delayed combination of the originally transmitted BPC-OFDM waveforms from different Tx channels. Finally, the host processor 102 receives those digital samples and performs the baseband processing and image reconstruction.

The full coherence between massive MIMO channels is done by using a high-accurate clock distributor module 414 that can provide both the time and frequency references to all the hardware components including SDRs 402_1, 402_2 . . . 402_N and the FMCW source 408. Specifically, the clock distributor 414 may provide the frequency reference (10 MHz in the example embodiment) for the FMCW source 408 and SDRs 402_1, 402_2 . . . 402_N, and the time reference (1PPS in the example embodiment) for the SDRs 402_1, 402_2 . . . 402_N to synchronize the trigger of Tx/Rx data streaming among massive MIMO channels. The clock distributor 414 can be either a customized FPGA or application-specific integrated circuit (ASIC), or a commercial clock module. Note that additional system phase and magnitude calibration (including both internal and external measurements) may be required to achieve a better coherency between massive MIMO channels.

In the described embodiment, the software implementation follows the same execution flowchart as described in FIG. 3 to coordinate all the radar hardware to perform 3D imaging in real-time.

Figure 5A:
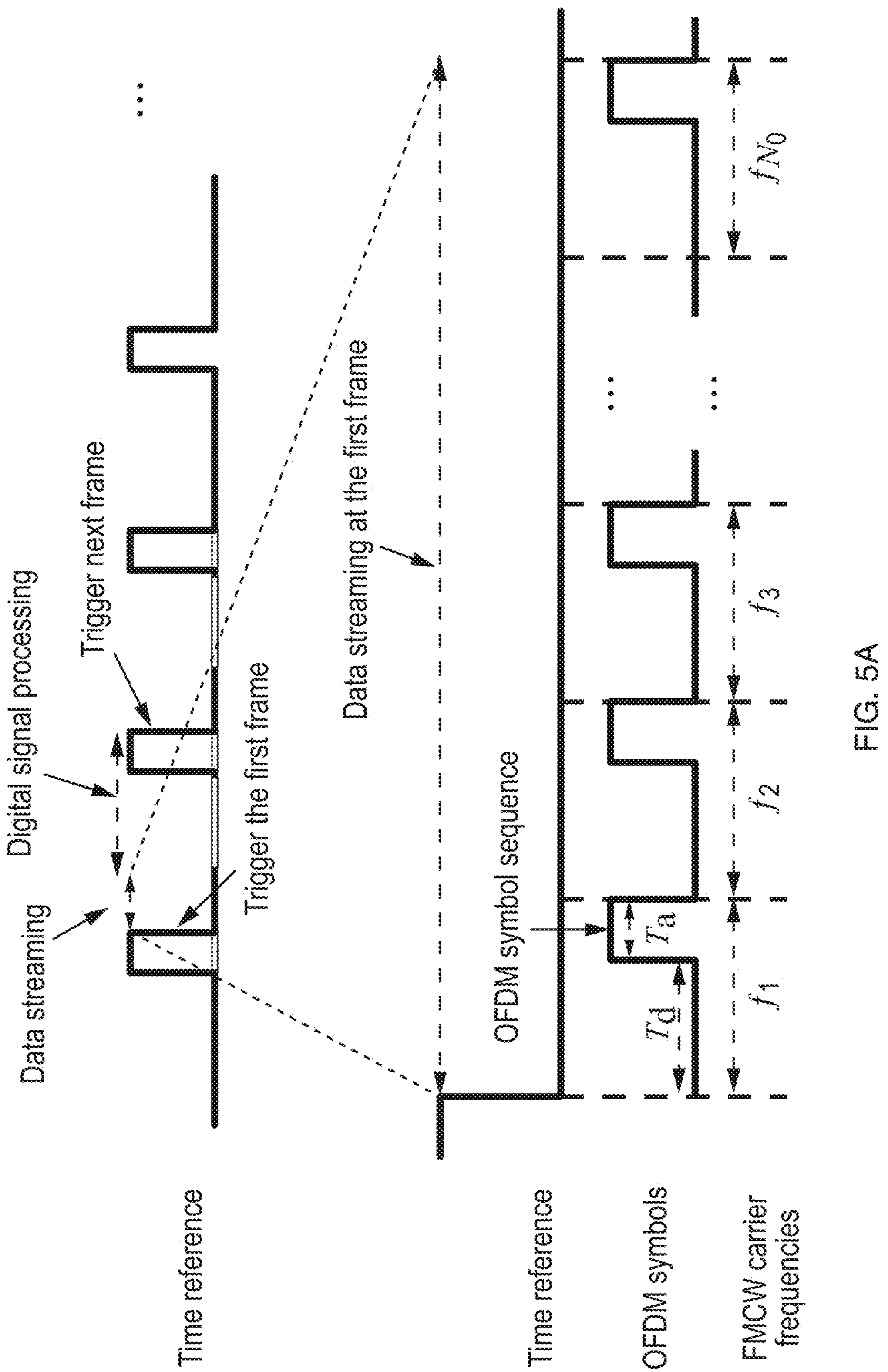
FIG. 5A shows the operation sequence of the example embodiment of the massive MIMO radar system.

FIG. 5A shows the operation sequence of the example embodiment of the massive MIMO radar system 400. The described embodiment of radar system 400 is responsive to the falling edge of the time reference, although a similar analysis can be applied to an embodiment that uses the rising edge of the time reference. Two actions are triggered simultaneously (or nearly simultaneously) at the occurrence of the falling edge. The first action is that the FMCW source 408 starts a full sweep from the start frequency $f_1$ to the end frequency $f_{N_0}$, where $N_0$ is the total number of FMCW carrier frequencies (frequency steps). The second action is that the SDRs 402_1, 402_2 . . . 402_N starts the data streaming in all the Tx and Rx channels during each frequency step.

In one embodiment, during the data streaming at each FMCW carrier frequency, the BPC-OFDM symbols are sent simultaneously (or nearly simultaneously) by all the Tx channels. Meanwhile, all the Rx channels capture the reflected BPC-OFDM waveforms, which are essentially a time-delayed combination of all the originally transmitted BPC-OFDM waveforms.

In FIG. 5A, the total data streaming time is $T_a$ for each FMCW carrier frequency. $T_d$ is the dwell-time before the data streaming to ensure the FMCW carrier frequency is stable, which is common in a stepped FMCW configuration; however, it can be theoretically zero in a continuous FMCW configuration. Once the data streaming is finished, the baseband processing and imaging reconstruction is carried out in the software of the host processor. The digital BPC-OFDM waveforms received by the host processor is demodulated using a linear channel estimation algorithm, as described in Equation (5), to retrieve the overall system channel response (measurement vector) g. As indicated in FIG. 5A, the total imaging formation time is mainly determined by the time reference. For instance, it will be 1 frame per second when using the 1PPS signal.

Figure 5B:
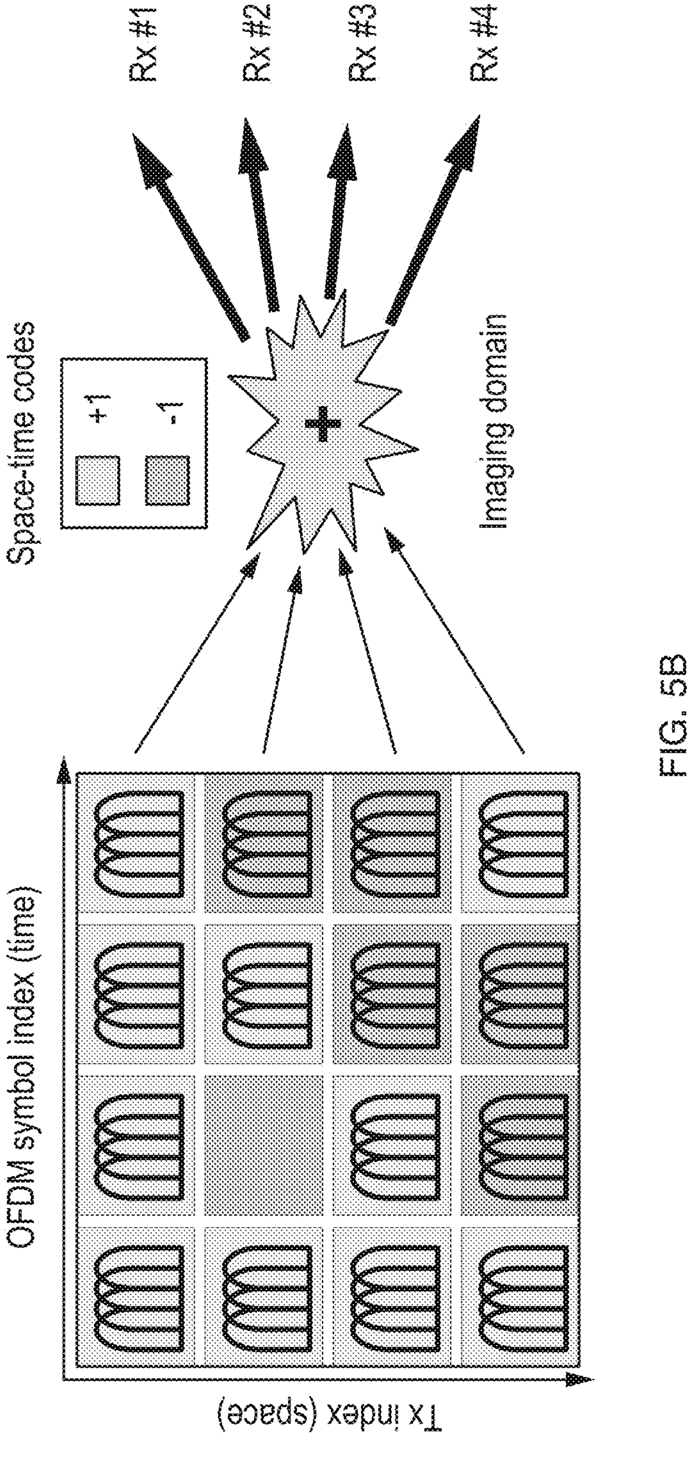
FIG. 5B illustrates an example of STC OFDM with four Txs and four Rxs.

Although arbitrary waveform generation is possible in the described embodiments, the radar waveform in the example embodiments presented herein uses space-time coding (STC) OFDM for simultaneous MIMO transmission at the same time and frequency. The use of STC OFDM may provide better receiving SNR and higher spectral efficiency, compared with conventional time-division or frequency-division imaging systems. In the described embodiments, the space-time codes are specifically constructed based on the Hadamard matrix, which allows simple decoupling and decoding to retrieve the transfer function of each virtual channel for imaging processing. An example of STC OFDM with four Txs and four Rxs is depicted in FIG. 5B, where the $i^{th}$ Tx transmits an OFDM sequence of four symbols with orthogonal space-time codes, either −1 or +1, which is designed based on the $i^{th}$ row of the Hadamard matrix. Each Rx receives a waveform which is a coupled and delayed combination of the simultaneously transmitted STC OFDM waveforms from different Txs. Assume the total number of Txs and Rxs is $N_t$ and $N_r$, respectively, and $n_t^{th}$ Tx and $n_r^{th}$ Rx are located at $r_{n_t}$ and $r_{n_r}$, respectively. The original baseband OFDM waveform without STC is expressed as $$s_0(t) = \sum_{n_{subc}=1}^{N_{subc}} c_{n_{subc}} e^{j2\pi(n_{subc}-N_{subc}/2-1)\Delta f_{subc} t} \tag{1}$$

where $N_{subc}$ is the number of subcarriers of each OFDM symbol; $c_{n_{subc}}$ is the pseudo-noise (pn) code, either −1 or +1, on the $n_{subc}^{th}$ subcarrier; $\Delta f_{subc}=(f_s/N_{subc})$ is the frequency spacing between two adjacent subcarriers, with $f_s$ being the sampling rate of the baseband AD/DA converters; and $T_s=(1/\Delta f_{subc})$ is the duration of each OFDM symbol.

The STC OFDM waveform requires the number of OFDM symbols $N_s$ for each Tx antenna at each FMCW carrier to be equal to the number of Tx channels, namely, $N_s=N_t$. Also, the $N_s$ STC OFDM symbols are duplicated at each FMCW carrier frequency $f_{n_c}$, $nc\in[1, N_c]$. Thus, the baseband STC OFDM sequence for the ntth Tx can be written as:

$$s_{n_c,n_t,n_s}^{Tx-BB}(t) = m_{n_t,n_s} rect_{n_c,n_s}(t) s_0(t), \tag{2}$$

where $m_{n_1,n_s}$, is the Hadamard-based space-time code (either −1 or +1) at the $n_s^{th}$ OFDM symbol at the $n_t^{th}$ Tx, and $rect_{n_c,n_s}(t)$ is the rectangular function representing the transmission window of the $n_s^{th}$ STC OFDM symbol at the $n_c^{th}$ FMCW carrier, namely $$rec_{n_c,n_s}(t) = rect\left(\frac{t-(n_c-1)N_sT_s-(n_s-1/2)T_s}{T_s}\right) \tag{3}$$

where rect(•) is the standard rectangular function. Accordingly, the IF output at the SDR is:

$$s_{n_c,n_t,n_s}^{Tx-IF}(t) = e^{jf_0^{IF}t} s_{n_c,n_t,n_s}^{Tx-BB}(t) \tag{4}$$

where $$f_0^{IF}$$

is a constant IF frequency for all the Tx and Rx channels.

Considering a stepped FMCW is generated by the external local oscillator (LO) module, the $$n_c^{th}$$

FMCW carrier can be expressed as $$s_{n_c}^{FMCW}(t) = e^{j2\pi[f_1+(n_c-1)\Delta f_c]t+\varphi_0} \tag{5}$$

where $f_1$ is the FMCW start frequency; $\Delta f_c$ is the FMCW frequency step size; and $\phi_0$ is the constant initial phase at each frequency step. Thus, the transmitted mm-wave at the $$n_t^{th}$$

Tx antenna can be expressed as $$s_{n_c,n_t,n_s}^{Tx-MMW}(t) = s_{n_c,n_t,n_s}^{Tx-IF}(t) s_{n_c}^{FMCW}(t). \tag{6}$$

Considering a point scatter is located at $r_o$ in the imaging domain, the received mm-wave at the $$n_r^{th}$$

Rx will be a delayed and attenuated version of the transmitted one, namely $$s_{n_c,n_r,n_t,n_s}^{Rx-MMW}(t) = \frac{1}{d_{n_t}d_{n_r}} s_{n_c,n_t,n_s}^{Tx-MMW}\left(t-\Delta t_{n_r,n_t}\right) \tag{7}$$

where $d_{n_t}=|r_{n_t}-r_o|$ and $d_{n_r}=|r_o-r_{n_r}|$ are the forward and backward propagation distance, respectively, and $\Delta t_{n_r,n_t}$ is the total propagation delay, namely $$\Delta t_{n_r,n_t} = \frac{2(d_{n_t}+d_{n_r})}{c_0} \tag{8}$$

where $c_0$ is the speed of the light in free space. Since all the $N_t$ Tx channels are transmitting simultaneously, the total received waveform by the $$n_r^{th}$$

Rx will be $$s^{Rx-BB}_{n_c,n_t,n_s}(t)=\sum_{n_t=1}^{N_t}s^{Rx-MMW}_{n_c,n_r,n_t,n_s}(t) \tag{9}$$

which will then be down-converted by mixing with the coherent FMCW, giving rise to IF input at the SDR. Thus, the received analog baseband is retrieved after IF down-conversion, namely $$\begin{aligned} s^{Rx-BB}_{n_c,n_t,n_s}(t) &= s^{Rx-MMW}_{n_c,n_t,n_s}(t)\{s^{FMCW}_{n_c}(t)\}^*\{e^{jf^{IF}_0 t}\}^* \\ &= \sum_{n_t=1}^{N_t}\frac{1}{d_{n_t}d_{n_r}}e^{-j2\pi[f_1+(n_c-1)\Delta f_c]\Delta t_{n_r,n_t}\times s^{Tx-BB}_{n_c,n_t,n_s}(t-\Delta t_{n_r,n_t})\times} \\ &\quad e^{-j2\pi f^{IF}_0\Delta t_{n_r,n_t}} \end{aligned} \tag{10}$$

where {•}* denotes the complex conjugate operation, representing the frequency down-conversions in the Rx chain. To construct the measurement vector for 3-D imaging, $$f^{Rx-BB}_{n_c,n_r,n_s}(t)$$

needs to be digitized and transformed to the frequency domain. Thus, equation (10) can be rewritten in a matrix form in the frequency domain as $$s^{Rx-BB}_{n_c,n_{subc}}|_{N_t\times N_s}=H_{n_c,n_{subc}}|_{N_r\times N_t}s^{Tx-BB}_{n_c,n_{subc}}|_{N_t\times N_s} \tag{11}$$

where $N_r=N_t=N_s$, $$f^{Tx-BB}_{n_c,n_{subc}}$$

is the transmitted STC OFDM matrix at the digital baseband, whose $(n_t, n_s)^{th}$ entry is $c_{n_{subc}}m_{n_t n_s}$;

$$S^{Rx-BB}_{n_c,n_{sibc}}$$

is the received STC OFDM matrix at the digital baseband; and $H_{n_c n_{subc}}$ is the channel response matrix with its $(n_r, n_t)^{th}$ entry defined by $h_{n_r n_t n_c n_{subc}}$, which represents the transfer function between the $$n_r^{th}$$

Rx and the $$n_t^{th}$$

Tx, namely $$h_{n_r,n_t,n_c,n_{subc}}=\frac{1}{d_{n_t}d_{n_r}}e^{-j2\pi f_{n_c,n_{subc}}\frac{2(d_{n_t}+d_{n_r})}{c_0}} \tag{12}$$

where $f_{n_c,n_{subc}}$ is the synthesized carrier frequency, defined as $$f_{n_c,n_{subc}}=f_1+(n_c-1)\Delta f_c+f^{IF}_0+(n_{subc}-N_{subc}/2-1)\Delta f_{subc}. \tag{13}$$

Considering the STC is designed based on the Hadamard matrix, $$S^{Tx-BB}_{n_c,n_{subc}}$$

in (11) can be rewritten as $$s^{Tx-BB}_{n_c,n_{subc}}=c_{n_{subc}}M \tag{14}$$

where M denotes the Hadamard matrix with an order of $N_t$. Note that the rows of M form a mutually orthogonal set of codes, namely, $MM^T=N_tI$, I being the identity matrix and $(\bullet)^T$ being the matrix transpose operation. Thus, the inversion of M is simply its transpose with a constant weight, namely $$M^{-1}=\frac{1}{N_t}M^T. \tag{15}$$

Therefore, $$S^{Rx-BB}_{n_c,n_{subc}}$$

can be decoupled and decoded easily by the following matrix multiplication:

$$H_{n_c,n_{subc}}=\frac{1}{c_{n_{subc}}N_t}S^{Rx-BB}_{n_c,n_{subc}}M^T \tag{16}$$

which gives rise to the estimated channel response matrix at each OFDM subcarrier at each FMCW carrier. Thus, the measurement vector $g_{subc}|_{N_g\times 1}$ at the $n_{subc}{}^{th}$ OFDM subcarrier can be constructed by cascading and vectorizing all $H_{n_c n_{subc}}$, $\forall n_c\in[1, N_c]$, namely:

$$g_{n_{subc}}=vec([\,H_{1,n_{subc}}\quad H_{2,n_{subc}}\quad \dots \quad H_{N_c,n_{subc}}]), \tag{17}$$

where $N_g=N_r\times N_t\times N_c$; and vec(•) denotes the vectorization operation on a matrix.

To perform 3-D object imaging, the sensing matrix $A_{subc}|_{N_g \times N_p}$ at the $n_{subc}^{th}$ OFDM subcarrier has to be computed according to MIMO array arrangement and imaging domain configuration, where $N_p$ is the total number of pixels with unknown reflectivity in the imaging domain. Denote $$E^{Tx}_{n_t n_c, n_{subc}} \text{ and } E^{Rx}_{n_r n_c, n_{subc}}$$

as the electric field distribution on the $n_t^{th}$ Tx aperture and the $n_r^{th}$ Rx aperture, respectively, at the carrier frequency defined in equation (13). Note that both Tx and Rx apertures are standard WR-12 ports in this example embodiment, and their electric field distributions can be computed by full-wave simulations. It should be understood that WR-12 ports are used for descriptive purposes, and that other such ports known in the art may alternatively be used. Using the surface equivalence theorem, the magnetic current sources $$M^{Tx}_{n_t n_c, n_{subc}} \text{ and } M^{Rx}_{n_r n_c, n_{subc}}$$

on the Tx and Rx apertures can be calculated as follows:

$$M^{Tx}_{n_t, n_c, n_{subc}} = -2n_0 \times E^{Tx}_{n_t, n_c, n_{subc}} \quad (18)$$
$$M^{Rx}_{n_r, n_c, n_{subc}} = -2n_0 \times E^{Rx}_{n_r, n_c, n_{subc}}$$

where $n_0$ is the outward normal vector at the Tx/Rx aperture. Thus, the Tx electric field $$E^{RoI}_{n_t n_c, n_{subc}, n_p}$$

and the Rx electric field $$E^{RoI}_{n_r n_c, n_{subc}, n_p}$$

in the imaging domain (or region of interest, RoI) can be computed using the near-field integration over the magnetic current sources, and the sensing matrix A can be computed using the first-order Born approximation, namely $$A_{n_r, n_t, n_c, n_{subc}, n_p} = E^{RoI}_{n_t, n_c, n_{subc}, n_p} \cdot E^{RoI}_{n_r, n_c, n_{subc}, n_p}. \quad (19)$$

Thus, the sensing matrix $A_{subc}|_{N_g \times N_p}$ can be constructed by cascading and reshaping the corresponding $A_{n_r n_t, n_c, n_{subc} n_p}$ at the $n_{subc}^{th}$ OFDM subcarrier.

The imaging reconstruction can be described to solve the inverse problem of Au+n=g, where A is the sensing matrix, u is the unknown reflectivity of the pixels in the RoI, representing the target profile in 3-D; n is the additive thermal noise; and g is the measurement vector. Such an inverse problem can be solved by norm-1 or norm-2-based regularization and iterative methods to obtain an optimized solution, however, at the expense of a high computational complexity. The described embodiments, however, utilize a computationally efficient method based on the matched filter $u=A^{\dagger}g$, which is commonly used in synthetic aperture radar (SAR), where $(\bullet)^{\dagger}$ is the transpose conjugate of a matrix. Note that the matched filter needs to be revised here to consider all the OFDM subcarriers, leading to the following reconstruction algorithm:

$$u = \frac{1}{N_{subc}} \sum_{n_{subc}=1}^{N_{subc}} A^{\dagger}_{n_{subc}} g_{n_{subc}} \quad (20)$$

which essentially performs imaging reconstructions at all the OFDM subcarriers.

In this revised matched filter, the total number of complex multiplications is $N_{subc}N_pN_g$, and the total number of complex additions is $N_{subc}N_p(N_g-1)+N_p(N_{subc}-1)$. Consequently, the total number of complex operations, namely, the overall computational complexity (CC), of the imaging processing algorithm is $$CC = N_{subc}N_p(2N_g - 1) + N_p(N_{subc} - 1)$$

The theoretical receiving SNR enhancement by STC, in comparison to conventional TDM, is analyzed as follows. The forward model of either STC or TDM with the thermal (Gaussian white) noise vector n at each Rx and each frequency can be described as $$s = hC + n \quad (22)$$

where $s|_{1\times N_t}$ is the raw received vector at the Rx channel; $C|_{N_t \times N_t}$ is the transmitted coding matrix based on either STC or TDM; $n|_{1\times N_t}$ is the thermal noise; and his the transfer function of the Tx-Rx pair which will be used to construct the measurement vector for imaging reconstruction. Thus, the estimated $\tilde{h}$ can be expressed as $$\begin{aligned}\tilde{h} &= sC^{-1} \\ &= h + nC^{-1}\end{aligned}. \quad (23)$$

Note that in the STC case, C is the Hadamard matrix M, as described herein by equations (14) and (15), and thus the equivalent thermal noise vector will be $n_{STC}=nM^{-1}$. While in the TDM case, C is an identical matrix I, and the equivalent thermal noise vector will be $n_{TDM}=nI^{-1}$. Assuming the variance of the thermal noise is $$\sigma_0^2,$$

the equivalent noise variances of the STC and TDM cases will be $$\sigma^2_{STC} = (\sigma_0^2/N_t) \text{ and } \sigma^2_{TDM} = \sigma_0^2,$$

respectively. Thus, the receiving SNR enhancement by STC in the proposed SDMMW imaging system, in comparison to the conventional TDM, is $$\frac{SNR_{STC}}{SNR_{TDM}} = 10\log_{10}\left(\frac{\sigma_{TDM}^2}{\sigma_{STC}^2}\right) = 10\log_{10}(N_t)\text{dB}. \quad (24)$$

An example SDMMW radar prototype, according to the described embodiments, was implemented as an example embodiment using four commercial cost-effective SDRs (each has two Tx and two Rx ports), an external tunable local oscillator (LO) with a 16-way power splitter to generate coherent stepped FMCW for all the Tx and Rx channels, a clock distributor to provide the baseband clock (10 MHZ) and timing reference at 1 pulse per second (PPS), some 90° and 180° RF couplers, eight off-the-shelf mm-wave Tx mixers (81-86 GHZ), eight off-the-shelf mm-wave Rx mixers (81-86 GHz), and a metal-printed 8-by-8 waveguide array to form total 64 virtual channels. The SDRs are attached to a USB 3.0 interface of a host PC. Note that the aforementioned modules were selected to demonstrate the general functionalities of the SDMMW multistatic architecture of the described embodiments, which are not limited to any specific brands or configurations.

The baseband STC OFDM is designed to have 32 subcarriers, namely, $N_{subc}$=32, and the baseband AD/DA sampling rate is eight mega-samples per second (MS/s), resulting in an overall Tx/Rx data rate of 512 MB/s, i.e., 8 MS/s×8 Bytes per complex float sample×8 channels, approaching the maximum throughput of a typical USB 3.0 interface. The IF input-output at the SDRs is set to 700 MHz. The stepped FMCW sweeps from 13.4 to 14.2 GHz, which is generated by the external LO module. The total 100 equally spaced FMCW frequencies are used in the following description. The Tx (or Rx) mm-wave mixer functions as a ×6 multiplier and an upconverter (or a downconverter). Thus, the mm-wave operates at a center frequency of 83.5 GHz with a bandwidth of 4.8 GHz. The FMCW frequency step time is 500 μs where the dwell time is 400 μs that is necessary for a stable phase lock loop in the LO module, and the remaining 100 μs is for the STC OFDM waveform streaming.

Figure 6A:
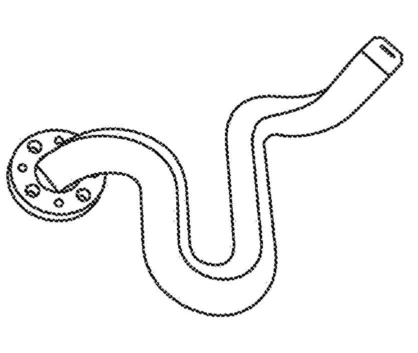
FIG. 6A illustrates a waveguide bend according to the invention.
Figure 6B:
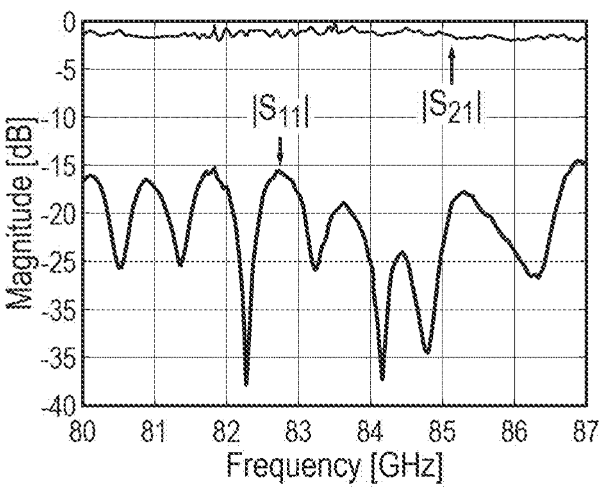
FIG. 6B shows the measured magnitude of the reflection coefficient associated with the waveguide bend depicted in FIG. 6A.
Figure 7:
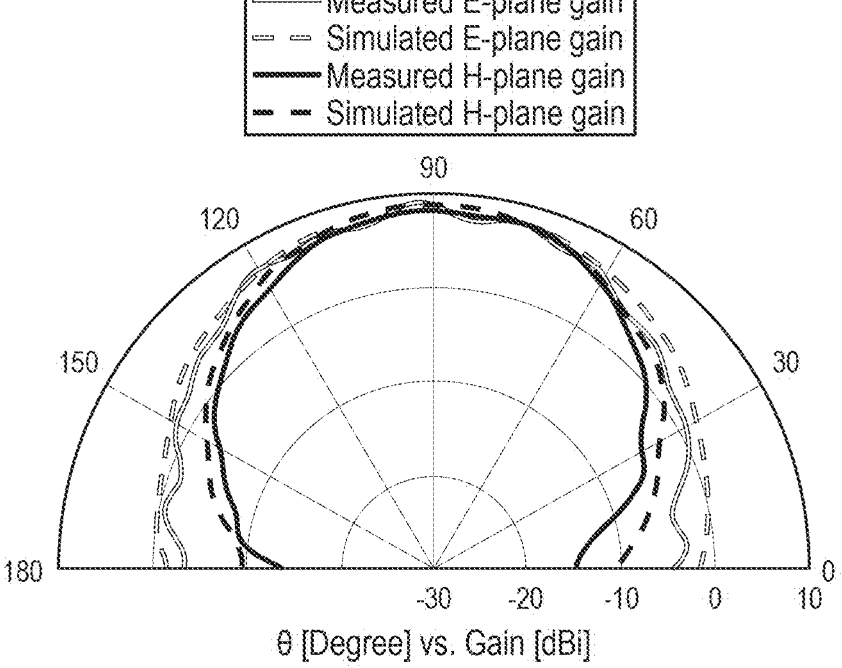
FIG. 7 shows simulated and measured gain patterns associated with the waveguide bend depicted in FIG. 6A.

The original Tx and Rx WR-12 ports of the mm-wave mixers are arranged in a square shape with an inter-port separation of 40 mm. Such a large separation is imposed by the physical dimension of the mm-wave mixers. To minimize the inter-port separation and reduce the sidelobe effect in mmwave images, a waveguide bend is first fabricated by direct metal laser sintering (DMLS), as shown in FIG. 6A. The UG-387/U flange is to be connected to the WR-12 port of the mm-wave mixer. As shown in FIG. 6B, the measured magnitude of the reflection coefficient ($|S_{11}|$) is below −15 dB within the radar operating band and the averaged transfer gain ($|S_{21}|$) is −1.4 dB, showing a good fabrication quality with a low propagation attenuation. Additionally, the far-field gain patterns of the waveguide bend are simulated and measured. As shown in FIG. 7, the simulated and measured 3-dB beam widths at the E-plane are 65.5° and 73.4°, respectively. The simulated and measured 3-dB beam widths at the H-plane are 57.5° and 59.3°, respectively. The simulated main lobe gains at the E-plane and the H-plane are both 8.8 dBi, and the measured main lobe gains at the E-plane and the H-plane are 9.1 dBi and 8.2 dBi, respectively.

Figure 8A:
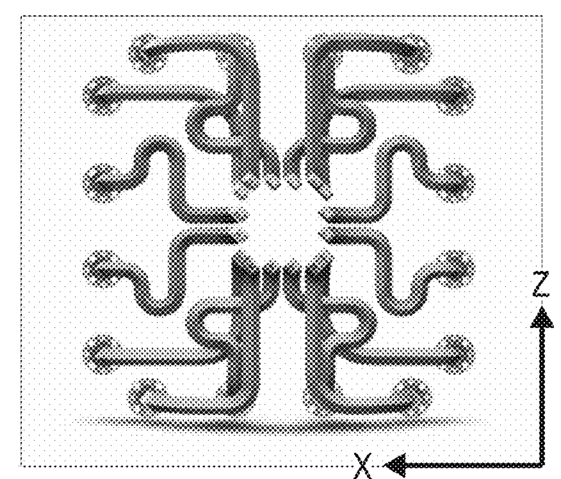
FIGS. 8A, 8B, and 8C show design and fabrication aspects of an entire waveguide array of the example embodiment.
Figure 8B:
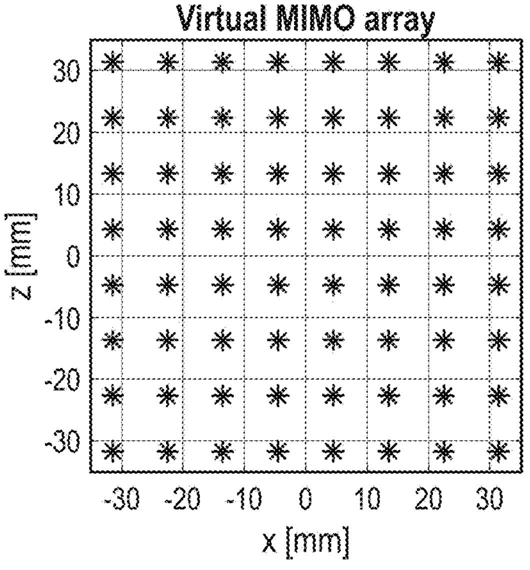
Figure 8C:
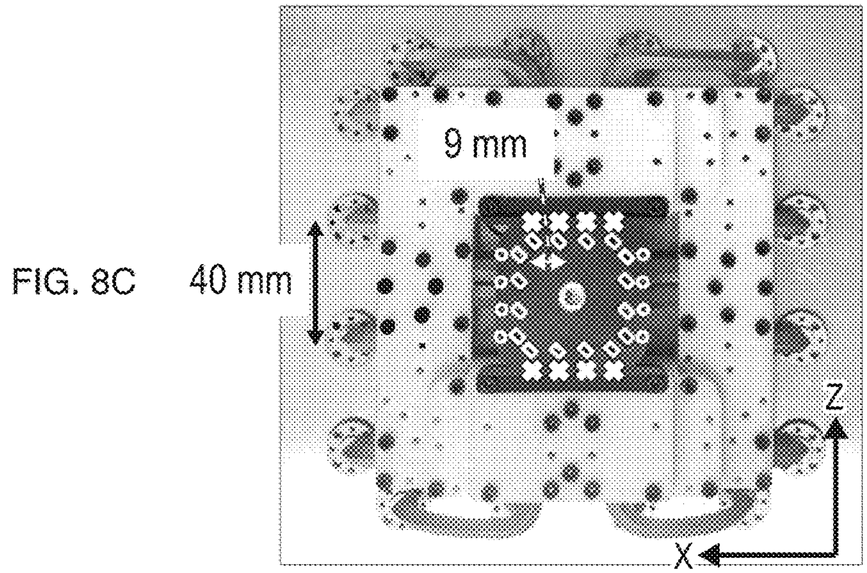

The design and fabrication of an entire waveguide array of the example embodiment with 16 ports are shown in FIGS. 8A, 8B, and 8C, where the eight Tx ports and eight Rx ports are aligned with the x-axis and z-axis, respectively. The waveguide array has an output inter-port separation of 9 mm. FIG. 8A shows the simulated model, simulated to optimize the shapes of all the waveguide parts so that their transfer functions, namely, $S_{21}$, exhibit approximately the same responses in magnitude and phase. FIG. 8B shows the corresponding virtual MIMO array that consists of 64 channels. The final fabricated waveguide array is shown in FIG. 8C where additional plastic parts are used to fix and align all 16 of the waveguide bends. The system parameters of the example embodiment are summarized in Table I, where Δd=9 mm is the output inter-port separation, $D_0$=36 mm is the MIMO aperture dimension, BW=4.8 GHz is the radar frequency bandwidth, and all the other parameters have been defined herein with respect to the example embodiments.

TABLE I

SYSTEM PARAMETERS OF THE RADAR PROTOTYPE

| Name | Value | Name | Value |
|---|---|---|---|
| $N_t$ | 8 | Δd | 9 mm |
| $N_t$ | 8 | $f_c$ | 83.5 GHz |
| $N_c$ | 100 | BW | 4.8 GHz |
| $N_{subc}$ | 32 | $T_d$ | 400 μs |
| $D_0$ | 36 mm | $T_a$ | 100 μs |

Figure 9:
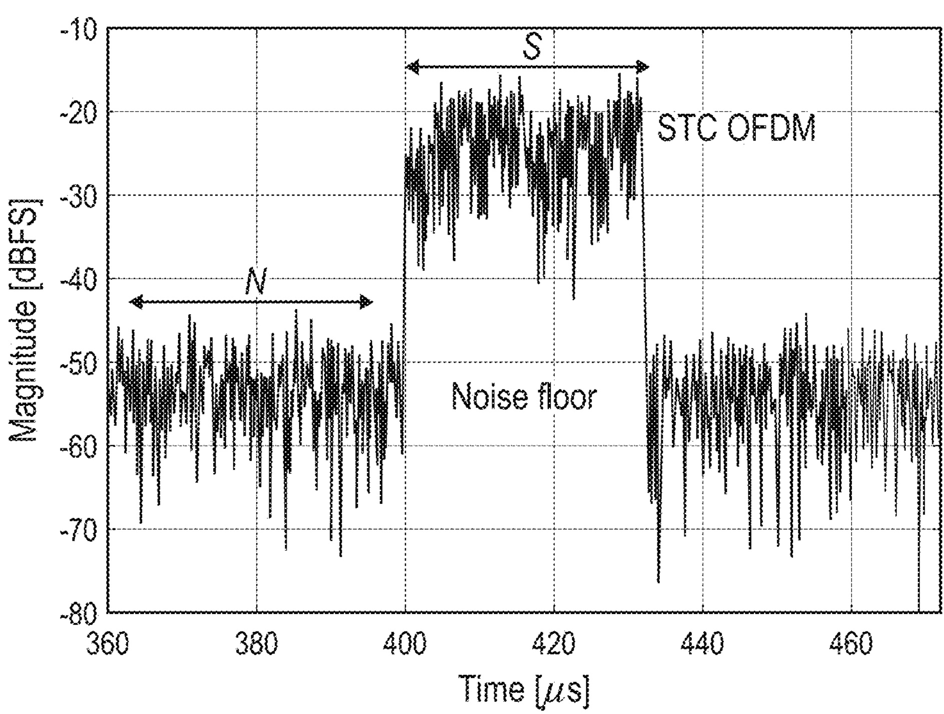
FIG. 9 shows a typical received STC OFDM waveform at each FMCW frequency step according to the invention.

To evaluate Tx power, the IF power transmitted from the SDR is first measured, which is PSDR=−25.5 dBm. Considering the gains of RF couplers and the conversion gain of the Tx mm-wave mixer, the estimated Tx power is:

$$\begin{aligned} P_{Tx} &= P_{SDR} + G_{0/90^\circ} + G_{0/180^\circ} + G_{Tx-Mixer} \\ &= -25.5 - 3.2 - 4.7 + 33 \\ &= -0.4 \text{ dB}m \end{aligned} \quad (25)$$

where $G_{0/90^\circ}$=−3.2 dB is the gain of the 0/90° coupler, $G_{0/180^\circ}$=−4.7 dB is the gain of the 0/180° coupler, and $G_{Tx\text{-}Mixer}$=33.0 dB is the conversion gain of the Tx mm-wave mixer. To estimate the Rx noise figure (NF), all the NFs of the cascaded modules in the Rx chain need to be considered, which results in the overall NF of the Rx chain as:

$$\begin{aligned} NF_{Rx} &= 10\log_{10}\left(NF_{Rx-Mixer} + \frac{NF_{0/180^\circ} - 1}{G_{Rx-Mixer}} + \frac{NF_{0/90^\circ} - 1}{G_{Rx-Mixer}G_{0/180^\circ}} + \frac{NF_{SDR} - 1}{G_{Rx-Mixer}G_{0/180^\circ}G_{0/90^\circ}}\right) \\ &= 10.3 \text{ dB} \end{aligned} \quad (26)$$

where $NF_{Rx\text{-}Mixer}$=10.0 dB is the NF of the Rx mm-wave mixer, $G_{Rx\text{-}Mixer}$=10.0 dB is the conversion gain of the Rx mm-wave mixer, $NF_{0/180^\circ}$=4.7 dB is the NF of the 0/180° coupler, and $NF_{0/90^\circ}$=3.2 dB is the NF of the 0/90° coupler. To measure the receiving SNR, a standard corner reflector (Eravant SAJ-014-S1) with an edge length of 35.56 mm and an effective radar cross section (RCS) of 0.13 $m^2$ is used, which is placed 100 cm away in front of the MIMO aperture. The typical received STC OFDM waveform at each FMCW frequency step is shown in FIG. 9. Thus, the receiving SNR can be estimated by $$SNR = 10\log_{10}\left(\frac{\sum_{n\in S}|r[n]|^2}{\sum_{n\in N}|r[n]|^2}\right) = 28.8\text{ dB} \tag{27}$$

where r[n] is the typical received waveform and n is the sample index. The measured SNR is the power ratio between the STC OFDM samples (the set S) and the thermal noise samples (the set N), where both sets S and N contain the same number of measurement samples.

The radar prototype of the example embodiment is calibrated before imaging any targets. Calibrating comprises measuring and compensating the phase and magnitude error among all MIMO channels to enable coherent multistatic operation. For an example calibration, the same corner reflector described herein with an edge length of 35.56 mm is used as the calibrator, which is placed in the far-field of the MIMO aperture and facing the array center. In this case, the distance must be larger than $$(2f_cD_0^2)/c_0 \approx 72\text{ cm.}$$

Figure 10:
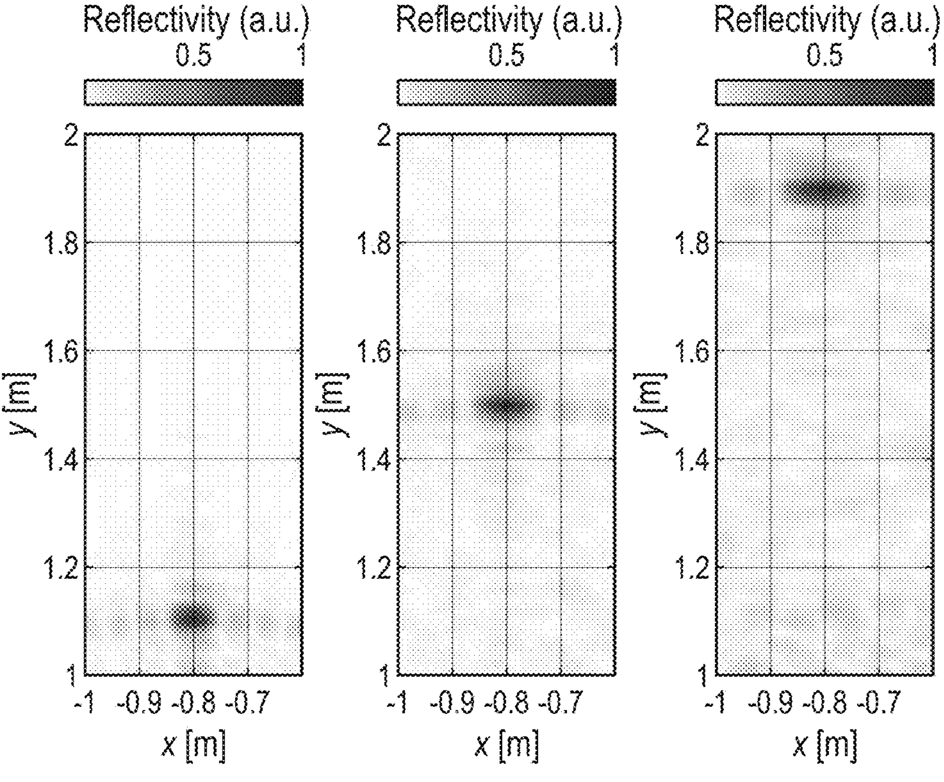
FIG. 10 shows the 2-D imaging reconstructions of the corner reflector at different ranges in the far-field of the MIMO aperture.

Thus, the corner reflector is placed 150 cm away in front of the MIMO array. The calibration process can be described as $$\tilde{g} = (g - g_{BG})\cdot\left(\frac{g_{C\text{-}SIM}}{g_{C\text{-EXP}} - g_{BG}}\right) \tag{28}$$

where $g_{BG}$ is the background measurement in the absence of any object in front of the radar (note that the mutual coupling effect among the antenna elements in the measurement vector may be eliminated during background subtraction); $g_{C\text{-}EXP}$ is the measured response of the calibrator at the far-field of the MIMO aperture; $g_{C\text{-}SIM}$ is the simulated response of the same calibrator; (•/•) is the element-wise division operation to measure and compensate the phase and magnitude error for all MIMO channels at each frequency; g is any raw measurement vector before calibration; and $\tilde{g}$ is the calibrated measurement vector for 3-D imaging processing. Considering the possible thermal drift that may occur during radar operation, periodical calibration is necessary to avoid potential thermal-induced frequency drift and imaging reconstruction distortion. To verify the effectiveness of the calibration scheme, additional measurements on the corner reflector with an edge length of 35.56 mm are performed. FIG. 10 shows the 2-D imaging reconstructions of the corner reflector at different ranges in the far-field of the MIMO aperture. As can be seen, the object is well-imaged and the imaged 3-dB size in the cross-range (x-axis) increases as the range extends. Thus, calibration effectiveness is verified.

Figures 11A, 11B:
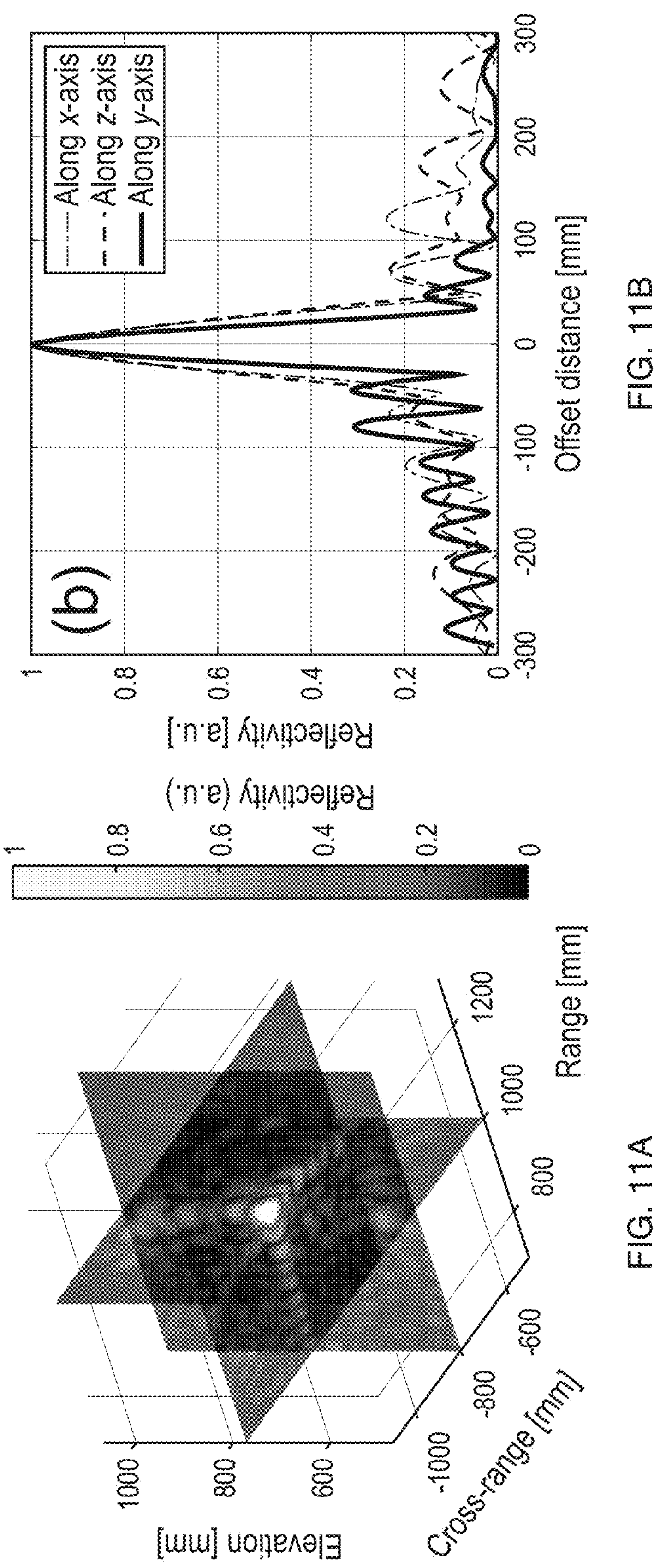
FIG. 11A shows the measured three dimensional (3-D) PSF at the range $R_0$=100 cm.
FIG. 11B shows the 1-D PSFs (corresponding to FIG. 11A) along the cross-range (x-axis), elevation (z-axis), and range (y-axis), respectively.

The point spread function (PSF) of the radar system is measured to see the focusing performance of the MIMO array. FIG. 11A shows the measured 3-D PSF at the range $R_0$=100 cm, and FIG. 11B shows the corresponding 1-D PSFs along the cross-range (x-axis), elevation (z-axis), and range (y-axis), respectively, where the 3 dB beamwidths are 58.3, 63.2, and 38.4 mm, respectively. To further evaluate the focusing performance of the radar system, the theoretical resolutions in the cross-range, elevation, and range are computed as follows:

$$\delta_{x/z} = \frac{c_0R_0}{2f_cD_0} = 49.9\text{ mm} \qquad \delta_y = \frac{c_0}{2BW} = 31.3\text{ mm.} \tag{29}$$

Additional measurements are taken to evaluate the dynamic range of the example embodiment. FIG. 12A shows the two corner reflectors used for the measurements where corner #1 (Eravant SAJ-007-S1-0.71) has an edge length of 18.0 mm, corresponding to an effective RCS of 0.0085 m2 at 83.5 GHZ, and corner #2 (Eravant SAJ-024-S1) has an edge length of 60.0 mm, corresponding to an effective RCS of 1.0514 m2 at 83.5 GHz. Those two objects are selected to ensure a large reflectivity contrast in mm-wave images, namely, to test a dynamic range>20 dB. FIG. 12B shows the calibration setup to image the two corner reflectors separated by 20 cm in the cross-range. FIGS. 12C, 12D, and 12E show the 2-D reconstructed profiles along the range and cross-range, where corner #1 is fixed at y=1.0 m and corner #2 is placed at y=1.0 m, y=1.1 m, and y=1.2 m, respectively. As can be seen in FIGS. 12D and 12E, both the corners are well-imaged when they are separated along the range, showing high dynamic range. However, in FIG. 12C, corner #1 is hardly distinguished from corner #2 due to the sidelobe effect. This is because current multistatic array has an antenna element separation of 9 mm (greater than a half wavelength), which, however, is almost the smallest separation that can be achieved based on the waveguide bend structure. To eliminate the sidelobe effect and achieve high dynamic range, the element separation may be reduced by utilizing a patch antenna array on a mm-wave printed circuit board (PCB).

Figure 13:
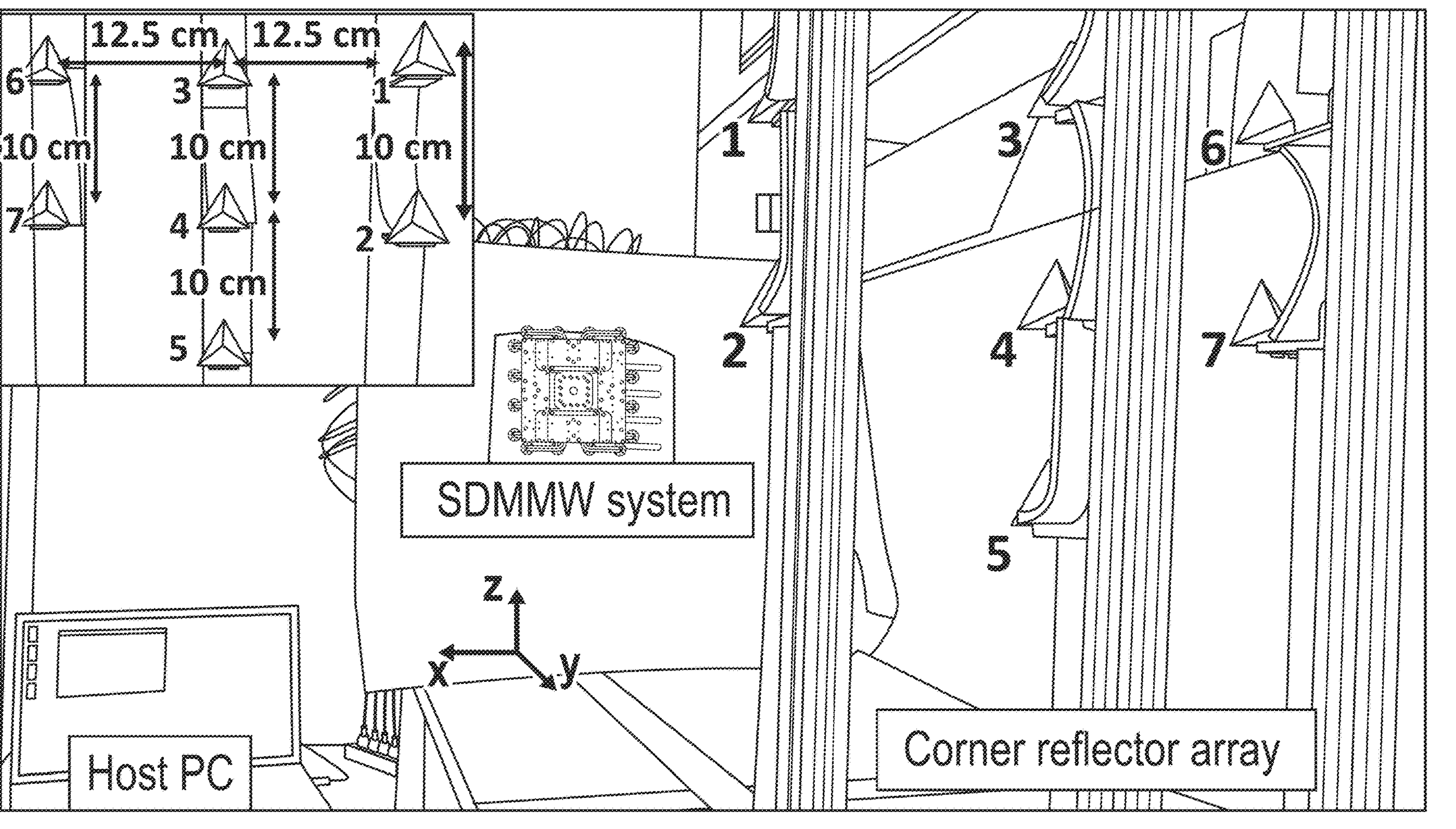
FIG. 13 shows the setup used to image an array of corner reflectors.
Figures 14A, 14B, 14C, 14D:
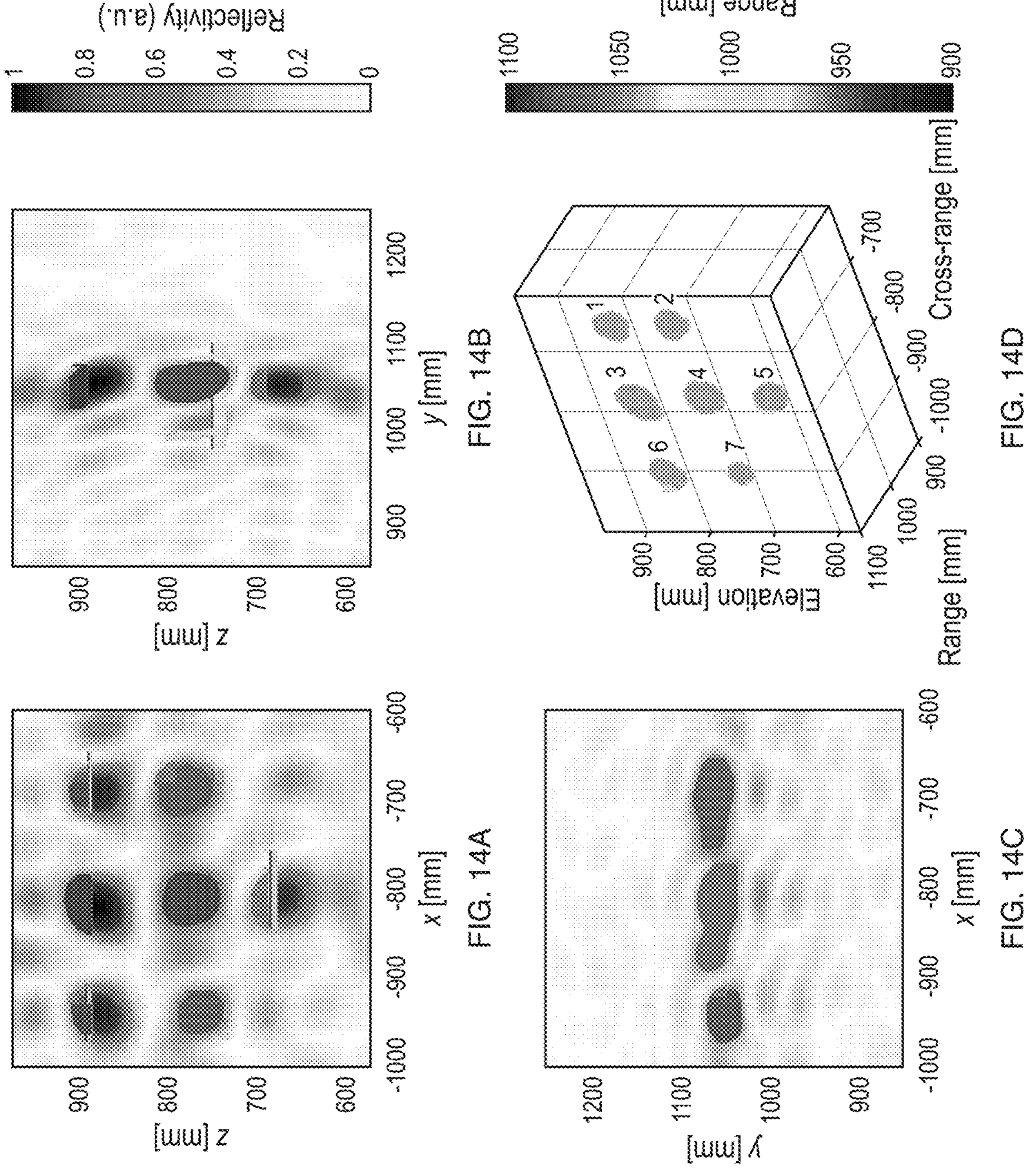
FIGS. 14A, 14B, 14C, and 14D show the 3-D imaging results of the corner reflector array described with respect to FIG. 13.
Figure 15B:
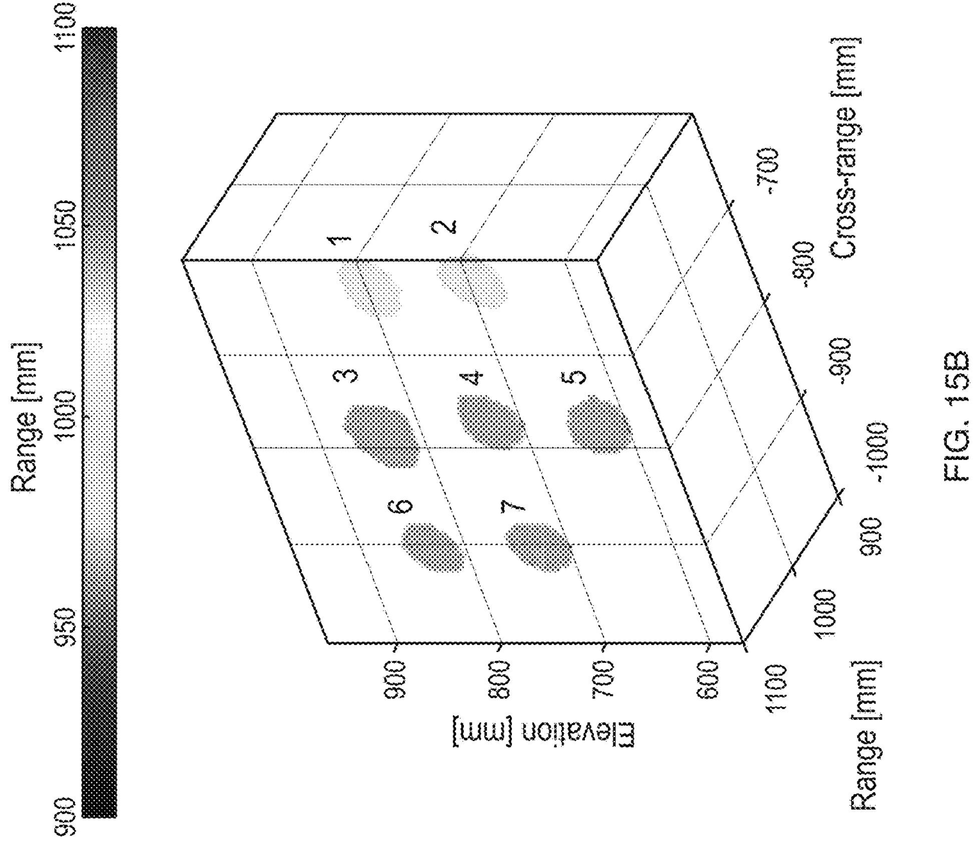
FIGS. 15A, 15B show the 3-D imaging results of the corner reflector array in a second demonstration.
Figure 15A:
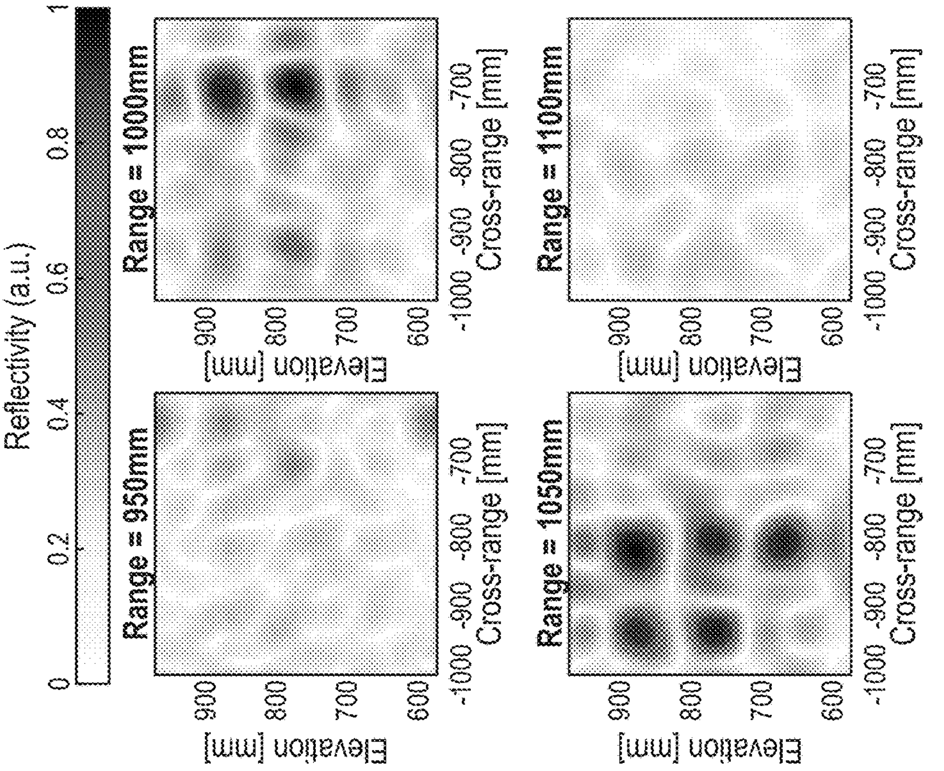

The computer instruction code in the radar prototype is developed using Python 2.0 with customized application programming interface (API) functions which are to coordinate all the hardware modules for 3-D imaging. Other platforms for generating the computer instruction code may alternatively be used. First, the SDRs are initialized by: 1) synchronizing the time of all SDRs to 0 at the arrival of the 1 PPS edge from the external clock distributor; 2) generating and caching the baseband STC OFDM waveform samples for each Tx in the random access memory (RAM) of the host PC; and 3) preloading the sensing matrices in RAM, which will be used in 3-D imaging reconstruction. Once initialized, all the MIMO channels wait for the first measurement trigger controlled by the computer instruction code. Note that the trigger interval needs to be matched with the FMCW sweeping rate that is $N_c\times(T_d+T_a)$=50 ms per cycle. Thus, the trigger interval should be N×50 ms, N being any positive integer, where the first 50 ms is for radar waveform streaming and the following (N−1)×50 is the time period for imaging processing. In the experiment, the host computer uses i7-9750H processor with total 12 threads, where the averaged imaging processing time is about 340 ms. Thus, to allow sufficient time for imaging processing, N=10 is selected, corresponding to an overall image formation rate of 2 fps (frames per second). Note that the current demonstrations mainly focus on imaging static objects due to the relatively slow frequency sweep of the external LO. However, using a much faster FMCW generator, real-time imaging with Doppler compensation may be achieved, where 4-D (1-D velocity+3-D object profile) object imaging can be achieved. The experimental setup to image an array of corner reflectors is given in FIG. 13, where the corner reflectors are customized and fabricated by metal printing. The corner reflectors have an identical shape with an edge length of 36 mm. As can be seen in the inserted subplot of FIG. 13, the corner reflectors have a measured cross-range separation of 12.5 cm and an elevation separation of 10 cm. In the first imaging experiment, all the corner reflectors #1-#7 are placed at the range 105 cm. While in the second imaging experiment, corner reflectors #1 and #2 are located at the range 100 cm; while corner reflectors #3-#7 are placed at the range 105 cm. The 3-D imaging results of the corner reflector array in the first experiment are plotted in FIGS. 14A, 14B, 14C, and 14D. The object reflectivity is plotted by different cuts at the x-z, y-z, and x-y planes, as shown in FIGS. 14A, 14B, and 14C, respectively. The imaged object profile in 3-D is presented in FIG. 14D, where only the pixels with normalized reflectivity larger than 0.45 are displayed. Similarly, the 3-D imaging results in the second demonstration are presented in FIGS. 15A and 15B, which show the reconstructed object reflectivity and profile, respectively. As can be seen from the demonstrated imaging results, all the corner reflectors are well-imaged and distinguished from each other in 3-D, showing a good imaging performance of the established radar prototype.

Another embodiment may be constructed and arranged to implement digital beamforming imaging with OFDM waveforms. The embodiment utilizes the same modularized hardware design as described with respect to FIG. 4, and follows a similar operation fashion as described with respect to FIG. 5, to perform the quasi-real-time/real-time 3D image formation. The main difference, however, falls in the digital signal processing part, which includes the baseband waveform processing and the imaging reconstruction when using the transmitting and receiving digital beamforming.

Transmitting digital beamforming waveform with OFDM at each FMCW carrier, where the ($n_t$, $n_p$)-th OFDM symbol is encoded with an appropriate phase delay of $\varphi_{n_t,n_p}$ that can be computed based on the position of the $n_p$-th focusing, $r_{n_p}$, and the position of the $n_t$-th Tx, $r_{n_t}$, $$\varphi_{n_t,n_p} = \frac{2\pi f_n \left| r_{n_t} - r_{n_p} \right|}{c_0}, \tag{30}$$

where $f_n$ is the frequency of the n-th FMCW carrier; and $c_0$ is the speed of light in the free-space. Thus, the combination the $n_p$-th OFDM symbol from all Txs will give rise to the $n_p$-th focusing pixel of the imaging domain. Note that the total number of OFDM symbols at each Tx equals to the total number of discretized pixels $N_p$ in the imaging domain. By transmitting all the phase-delayed OFDM symbols, the focusing point will be scanned throughout the imaging domain.

To retrieve the target profile (or reflectivity), the imaging reconstruction will have to perform the receiving digital beamforming, which can be viewed as a reciprocity of the transmitting digital beamforming. The signal processing on the received digital baseband OFDM waveform samples is shown as follows:

$$u_{n_p} = \sum_{n=1}^{N_0} \sum_{n_t=1}^{N_a} S_{n_t,n_p} e^{j\frac{2\pi f_n \left| r_{n_t} - r_{n_p} \right|}{c_0}}, \tag{31}$$

where $N_a$ is the total number of Txs/Rxs; $N_0$ is the total number of FMCW carriers; $r_{n_t}$ is the position of the $n_r$-th Rx; and $S_{n_t,n_p}$ is the received digital baseband OFDM waveform sample in the frequency domain; and $u_{n_p}$ is the retrieve the target reflectivity at $n_p$-th focusing point. Thus, the 3D imaging reconstruction is done by scanning the focusing point throughout the imaging domain and plotting the retrieved reflectivity corresponding at each pixel in the imaging domain.

The reconstruction algorithm in the digital beamforming imaging with OFDM is much simpler and faster, compared to that used in the space-time coding imaging with OFDM; however, much less OFDM symbols are required to be collected in the latter system, which gives rise to a much shorter data streaming time. Moreover, the digital beamforming imaging can provide a better receiving signal-to-noise ratio (SNR) due to the beamforming, compared to that in the space-time coding imaging. Thus, an appropriate trade-off is to be made to determine which kind of embodiment to be used in practical imaging applications, by considering all the factors including the image formation time, the receiving SNR, and the imaging reconstruction complexity.

Spatial or spectral coding over an aperture between the MIMO array and the region of interest (RoI) may reduce redundant information, where the singular value distribution of the sensing matrix becomes more flattened for a higher sensing capacity, or better imaging performance. The use of metamaterial apertures is one of the dominant coding approaches which can create the spectral diversity. One representative work is the metasurface-aperture-based MIMO mm-wave imager [see, J. Gollub, O. Yurduseven, K. P. Trofatter, D. Arnitz, M. F Imani, T. Sleasman, M. Boyarsky, A. Rose, A. Pedross-Engel, H. Odabasi et al., "Large metasurface aperture for millimeter wave computational imaging at the human-scale," Scientific Reports, vol. 7, no. 1, pp. 1-9, February 2017], which can use STC for simultaneous operation of 24 TXs and 72 RXs at the K-band. The imager uses a relatively slow step-frequency sweep which is necessary to characterize the aperture fields of those frequency-dispersive metasurface apertures using a vector network analyzer. Those aperture fields are the basis to compute the sensing matrix for the imaging reconstruction. The imager shows a raw data acquisition rate of 7 Hz, corresponding to a small maximum unambiguity velocity, thus not suitable for imaging common on-the-move objects. Additionally, it is usually expensive to fabricate such metamaterial apertures using the printed circuit boards (PCBs), and those metamaterial apertures suffer from the energy loss from the substrate materials at the mm-wave band.

The compressive reflector antenna (CRA) is another cost-effective implementation of the aperture coding, which can introduce the spatial diversity (see, e.g., U.S. Pat. No. 10,698,101, the entire contents of which are hereby incorporated by reference). The CRA can be manufactured by coating the surface of a traditional reflector antenna with the metallic triangle units that have pseudo-random tilts. The use of CRA can provide a moderate sensing capacity improvement, while keeping a much lower cost and energy loss, compared to the metamaterial apertures. The described embodiments demonstrate the four-dimensional (4-D) imaging of on-the-move objects (1-D velocity and 3-D profile). The described embodiments leverage the cost-effective CRAs and the SDMMW MIMO arrays with a fast frequency-modulated continuous-wave (FMCW) source. The spatial diversity is created by the CRA for informative measurements to achieve a high sensing capacity. The SDMMW array generates orthogonal STC waveforms for simultaneous MIMO operation to obtain a high receiving SNR. An example embodiment of an imaging system comprises a modularized 8-by-8 SDMMW radar and a CRA. The CRA is designed with the laser-aided alignment to minimize the positioning errors of the MIMO array and the CRA. The fast FMCW modulation is developed based on a commercial voltage-controlled oscillator (VCO) module where an optimized voltage profile is designed for the linearized frequency sweep. The mm-wave FMCW goes from 81.67 GHz to 86.69 GHz within 50 seconds, for a chirp rate of 5.02 GHz/50 s. Considering each STC chirp loop (8 chirps) forming one complete measurement vector for the 3-D object profile reconstruction, a raw data acquisition rate of 2500 volumetric frames per second (fps) is achieved. Moreover, by using multiple STC chirp loops, the object velocity is estimated with a maximum unambiguous velocity of +/−2.23 m/s, beyond normal human walking speed. Both simulations and experiments have shown good imaging performance of on-the-move objects, giving great potential for developing cost-effective high-throughput mm-wave security screening systems with on-the-move imaging capability.

Figure 16:
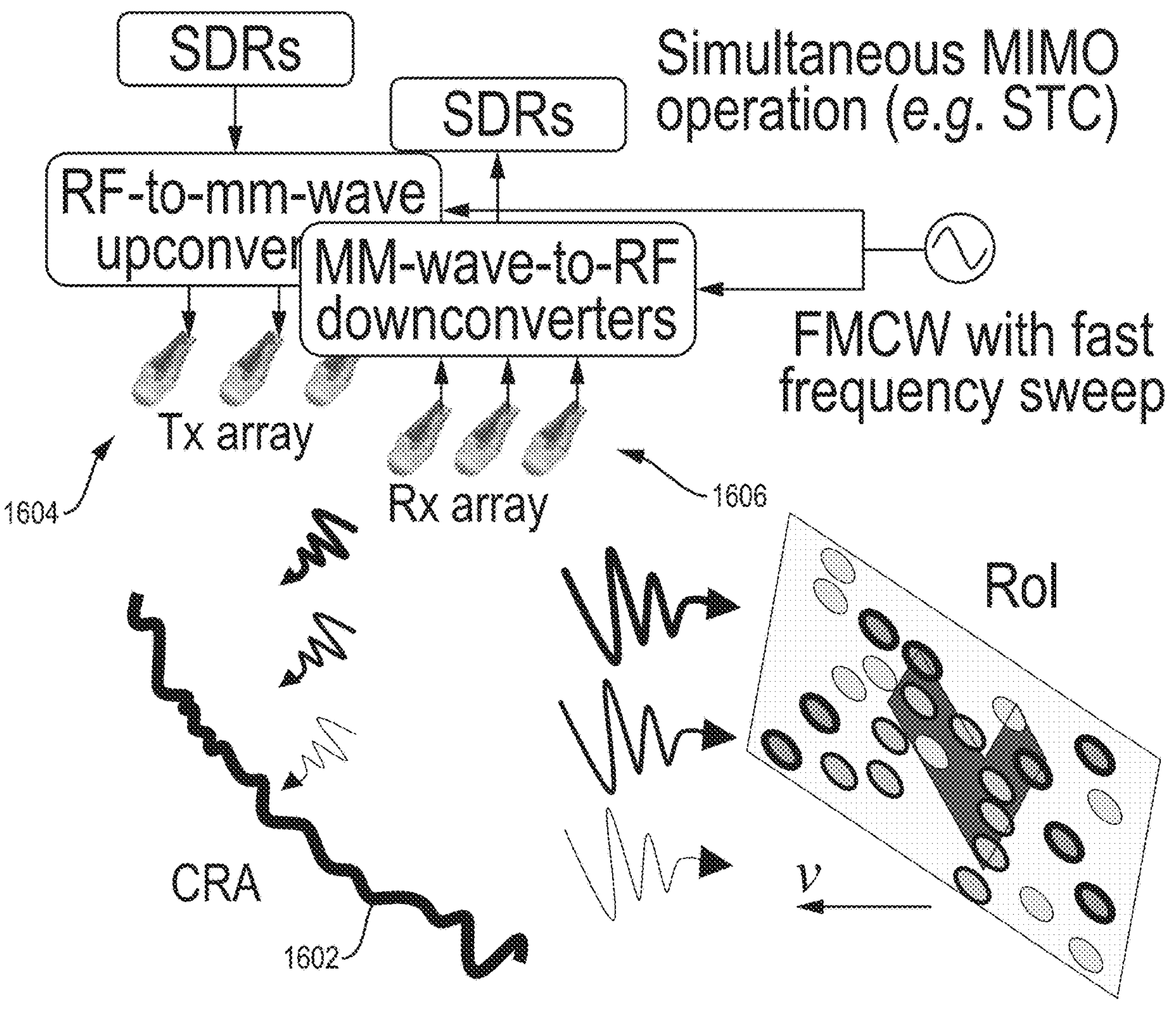
FIG. 16 shows an example embodiment of a SDMMW MIMO associated with a compressive reflector antenna (CRA).

The system concept on the 4-D imaging of on-the-move objects is described in FIG. 16 where only one CRA 1602 with its feeding Tx array 1604 and Rx array 1606 is illustrated for a simplified analysis. More general imaging setup can consist of multiple CRAs with their corresponding feeding arrays in a multistatic configuration. The Tx and Rx arrays are designed based on the SDMMW MIMO which can be integrated on PCBs or modularized by commercial cost-effective modules. One of the most important features of the SDMMW MIMO array is its capability to generate and process arbitrary radar waveforms. The example embodiment of the SDMMW MIMO array may use the hardware architecture as described herein, with a fast FMCW based on an external VCO module to achieve a fast data acquisition and a large maximum unambiguous velocity. The STC FMCW waveform allows simultaneous MIMO operation for a high receiving SNR. The signal propagation from the Tx array to the Rx array can be described as follows: In the forward propagation, the software-defined radios (SDRs) first create the STC single tone signals at a radio frequency (RF), which are allocated to different Tx ports of the SDRs and transmitted simultaneously. Those single tone signals are then fed into the RF-to-mm-wave upconverters which also take in the coherently distributed FMCW with the fast frequency sweep. The upconverters function as ×6 multipliers and mixers to generate the mm-wave STC FMCW, which is eventually radiated from the Tx array. The CRA is inserted between the MIMO aperture and the RoI, which is to introduce the spatial diversity to improve the sensing capacity of the imaging system. The RoI contains an on-the-move object with a velocity of v, as illustrated in L-shaped. Note that v can be either positive or negative, corresponding to moving farther away from or closer to the CRA, respectively. The incident wave interacts with the object to create a reflected wave. Similarly, in the backward propagation, the Rx array will capture the reflected mm-wave STC FMCW from the CRA, which is then down-converted by the mm-wave-to-RF downconverters with the coherently distributed FMCW as used at the Tx end. The RF outputs from the downconverters will be fed into the SDRs for further processing to produce the baseband waveform samples.

In a more general case with multiple CRAs in a multistatic configuration, the above signal propagation will be repeated throughout all the combinations of the $i^{th}$ Tx array and the $j^{th}$ Rx array, $\forall i,j \in [1, N_0]$, $N_0$ being the total number of CRAs employed in the imaging setup. The final baseband waveform samples are transferred to a host computer to perform the 4-D image formation where the system-level MIMO calibration, the 1-D velocity estimation, the motion compensation, and the 3-D object profile reconstruction will be performed.

As shown in FIG. 16, the example embodiment of a SDMMW MIMO consists of $N_t$ Txs and $N_r$ Rxs, and only the first STC loop is considered since all the STC loops have the same waveform. Each STC loop consists of $N_c$ FMCW chirps, where $N_c=N_t=N_r$, and each FMCW chirp duration is $T_c$. The RF STC single tone signal at the $n_t^{th}$ Tx can be written as $$s_{n_t,n_c}^{Tx-RF}(t) = c_{n_t,n_c} rect_{n_c}(t) e^{j2\pi f_{SDR} t + \varphi_{n_t}} \tag{32}$$

where $c_{n_t,n_c}$ is the STC code applied to the $n_c^{th}$ chirp at the $n_t^{th}$ Tx, $f_{SDR}$ is the RF single tone signal, $\varphi_{n_t}$, is a random initial phase, and $rect_{n_c}(t)$ is the rectangular function representing the transmitting time window of the $n_c^{th}$ chirp, $$rect_{n_c}(t) = rect\left(\frac{t-(n_c-1/2)T_c}{T_c}\right) \tag{33}$$

where rect(•) is the standard rectangular function. The FMCW waveform can be expressed as $$s^{FMCW}(t) = e^{j2\pi\left(f_{VCO}+\frac{1}{2}\alpha t\right)t} \tag{34}$$

where $f_{VCO}$ is the start frequency, and a is the chirp rate denoted as the frequency bandwidth per chirp time, i.e. $B/T_c$, B being the chirp bandwidth. Thus, the transmitted mm-wave at the $n_t^{th}$ Tx antenna is $$s_{n_t,n_c}^{Tx-MMW}(t) = s_{n_t,n_c}^{Tx-RF}(t) s^{FMCW}(t). \tag{35}$$

Considering a point scatter is located at r0 in the imaging domain, the received mm-wave at the nrth Rx will be $$s_{n_t,n_c,n_r}^{Rx-MMW}(t) = h_{n_t,n_r}(t) * s_{n_t,n_c}^{Tx-RF}(t) \tag{36}$$

where $h_{n_t,n_r}(t)$ is the time-domain transfer function between the $n_t^{th}$ Tx and $n_r^{th}$ Rx, which includes the spatial coding effect by the CRA, and the magnitude attenuation and the phase delay due to the free-space propagation. To retrieve the transfer function $h_{n_t,n_r}$, the analysis of its frequency response $H_{n_t,n_r}(f)$ is performed, where $H_{n_t,n_r}(f)=FT\{h_{n_t,n_r}(t)\}$, FT{•} being the Fourier transform (FT). Considering the forward propagation from the $n_t^{th}$ Tx at the position $r_{n_t}$, to the object point at $r_0$, the following transfer function is derived, which is a 2-D integral over the CRA surface:

$$H_{n_t}(f) = \iint_S \delta_{r_{n_t}, r_s, r_0, n_s} e^{-j2\pi \frac{f}{c_0}(|r_{n_t} - r_s| + |r_s - r_0|)} ds \tag{37}$$

where S represents the triangle-meshed CRA surface; $r_s$ is the position of each mesh unit; $n_s$ is the outwards norm vector at each mesh unit; f is the mm-wave frequency; $c_0$ is the speed of light; and $$\delta_{r_{n_t} r_s r_0 n_s}$$

is the forward reflection coefficient at each mesh unit on the CRA surface. Note that $$\delta_{r_{n_t} r_s r_0 n_s}$$

can be derived using the modified equivalent current approximation (MECA), which represents a generalization of the Physical Optics (PO) for both conducting and nonconducting dielectric surfaces.

Similarly, in the backward propagation from the object point at $r_0$ to the $n_r^{th}$ Rx at the position $r_{n_r}$, the following 2-D surface integral exists, $$H_{n_r}(f) = \iint_S \delta_{r_0, r_s, r_{n_r}, n_s} e^{-j2\pi \frac{f}{c_0}(|r_0 - r_s| + |r_s - r_{n_r}|)} ds \tag{38}$$

where $$\delta_{r_0 r_s r_{n_r}, n_s}$$

is the backward reflection coefficient at each mesh unit on the CRA surface. Therefore, the overall transfer function between the $n_t^{th}$ Tx and $n_r^{th}$ Rx can be expressed as:

$$H_{n_r, n_t}(f) = H_{n_r}(f) \cdot H_{n_t}(f). \tag{39}$$

Since all the Nt Txs are transmitting simultaneously, the total received waveform by the $n_r^{th}$ Rx will be:

$$s_{n_c, n_r}^{Rx-MMW}(t) = \sum_{n_t=1}^{N_t} s_{n_t, n_c, n_r}^{Rx-MMW}(t) \tag{40}$$

which is then downconverted with the coherent FMCW, giving rise to the RF input at the SDR, namely:

$$s_{n_c, n_r}^{Rx-RF}(t) = s_{n_c, n_r}^{Rx-MMW}(t) \{s^{FMCW}(t)\}^* \tag{41}$$

where $\{\bullet\}^*$ denotes the complex conjugate operation, representing the frequency downconversion in the Rx chain. The Rx baseband samples retrieved within the SDRs can be rewritten in a matrix form in the frequency domain as:

$$S_{n_f}^{N_r \times N_c} = H_{n_f}^{N_r \times N_t} C \tag{42}$$

where $n_f$ the frequency index, $$S_{n_f}^{N_r \times N_c}$$

is the raw measurement matrix, $$H_{n_f}^{N_r \times N_t}$$

is the channel matrix whose entries are defined in equation (39), and C is the STC matrix for simultaneous MIMO operation. Note the total number frequencies satisfies $N_f = Tc \times f_s$, $f_s$ being the baseband sampling rate. C is specifically designed based on the Hadamard matrix with an order of $N_t$. The use of the Hadamard matrix allows simple decoupling and decoding, where the rows of C form a mutually orthogonal set of codes, namely $CC^T = N_t I$, I being the identity matrix and $(\bullet)^T$ being the matrix transpose operation. The inversion of C is simply its transpose with a constant weight, namely:

$$C^{-1} = \frac{1}{N_t} C^T. \tag{43}$$

Thus, the channel response $$H_{n_f}^{N_r \times N_t}$$

can be retrieved easily by the following matrix multiplication, $$H_{n_f}^{N_r \times N_t} = \frac{1}{N_i} S_{n_f}^{N_r \times N_c} C^T \tag{44}$$

Accordingly, the measurement vector $g|_{N_g \times 1}$, $N_g = N_r \times N_t \times N_f$, at the first STC loop can be constructed by cascading and vectorizing all $$H_{n_f}^{N_r x N_t},$$

$\forall n_f \in [1, N_f]$, namely:

$$g^{N_g \times 1} = vec\left(\left[H_1^{N_r \times N_t}, H_2^{N_r \times N_t}, \ldots, H_{N_f}^{N_r \times N_t}\right]\right) \tag{45}$$

where vec $(\bullet)$ denotes the vectorization operation on matrices.

In a more general case that uses $N_0$ CRAs with each fed by an SDMMW feeding array in a multistatic configuration, equation (45) will be computed for each pair of the $i^{th}$ Tx array and $j^{th}$ Rx array to obtain the corresponding measurement vector $$g_{i,j}^{1\times N_g},$$

$\forall$i,j$\in$[1, $N_0$], which are then combined into the overall measurement vector g, namely $$g^{M_g\times 1} = vec\left(\left[g_{1,1}^{1\times N_g}, \ldots, g_{i,j}^{1\times N_g}, \ldots, g_{N_0,N_0}^{1\times N_g}\right]\right) \tag{46}$$

where g is a vector with $M_g=N_g\times N_0\times N_0$ elements.

The imaging reconstruction can be described to solve the inverse problem Au+n=g where A is the sensing matrix, u is the unknown reflectivity representing the object profile in 3-D; n is the additive thermal noise; and g is the measurement vector. Such an inverse problem can be solved by the norm−1 based regularization and iterative algorithms or the inverse fast multipole method, but the described embodiments adopt a much more computationally cost-effective method based on the matched filter, namely $$u = A^{\dagger} g \tag{47}$$

where $(\bullet)^{\dagger}$ is the transpose conjugate of a matrix, which is commonly used in the synthetic aperture radar (SAR). Note that this matched filter will be revised by adding the motion compensation for on-the-move object imaging.

To compute the sensing matrix A for the imaging reconstruction, the simulation setup, same as that in the experiment, needs to be established. Considering the first-order Born approximation and the well-defined geometrical surface profile of the CRA, the PO simulation can be adopted which uses the exact free-space near-field propagation equations. Considering one CRA is used first, the PO simulation of the Tx and Rx electric fields in the RoI for the $$n_f^{th}$$

frequency, the $$n_t^{th}$$

Tx, and the $n^{rth}$ Rx will go through the following computation procedure:

$$\begin{aligned} J_{n_t,n_f} &\to E_{n_t,n_f}^{CRA}, H_{n_t,n_f}^{CRA} \to J_{n_t,n_f}^{CRA} \to E_{n_t,n_f,n_p}^{RoI} \\ J_{n_r,n_f} &\to E_{n_r,n_f}^{CRA}, H_{n_r,n_f}^{CRA} \to J_{n_r,n_f}^{CRA} \to E_{n_r,n_f,n_p}^{RoI} \end{aligned} \tag{48}$$

where $J_{n,n_f}$ and $J_{n,n_f}$ are the constant current sources for the Txs and Rxs, respectively;

$$E_{n_t n_f}^{CRA} \text{ and } E_{n_r n_f}^{CRA}$$

are the incident electric fields on the CRA surface by the $n_t^{th}$ Tx and the $$n_r^{th}$$

Rx (in reciprocity), respectively;

$$H_{n_t n_f}^{CRA} \text{ and } H_{n_r n_f}^{CRA}$$

are the incident magnetic fields on the CRA surface by the $$n_t^{th}$$

Tx and the $$n_r^{th}$$

Rx, respectively;

$$J_{n_t n_f}^{CRA} \text{ and } J_{n_r n_f}^{CRA}$$

are the equivalent electric current sources on the CRA surface, computed based on the MECA; and $$E_{n_t n_f n_p}^{RoI}; np \text{ and } E_{n_r n_f n_p}^{RoI}$$

are the electric fields created by the $$n_t^{th}$$

Tx and the $$n_r^{th}$$

Rx, respectively, at the $n^{pth}$ pixel in the RoI, $n_p\in[1,N_p]$, $N_p$ being the total number of pixels in the RoI. Thus, the sensing matrix A can be computed by:

$$A_{n_r,n_f,n_t,n_p} = E_{n_t,n_f,n_p}^{RoI} E_{n_r,n_f,n_p}^{RoI}. \tag{49}$$

Figures 17A, 17B:
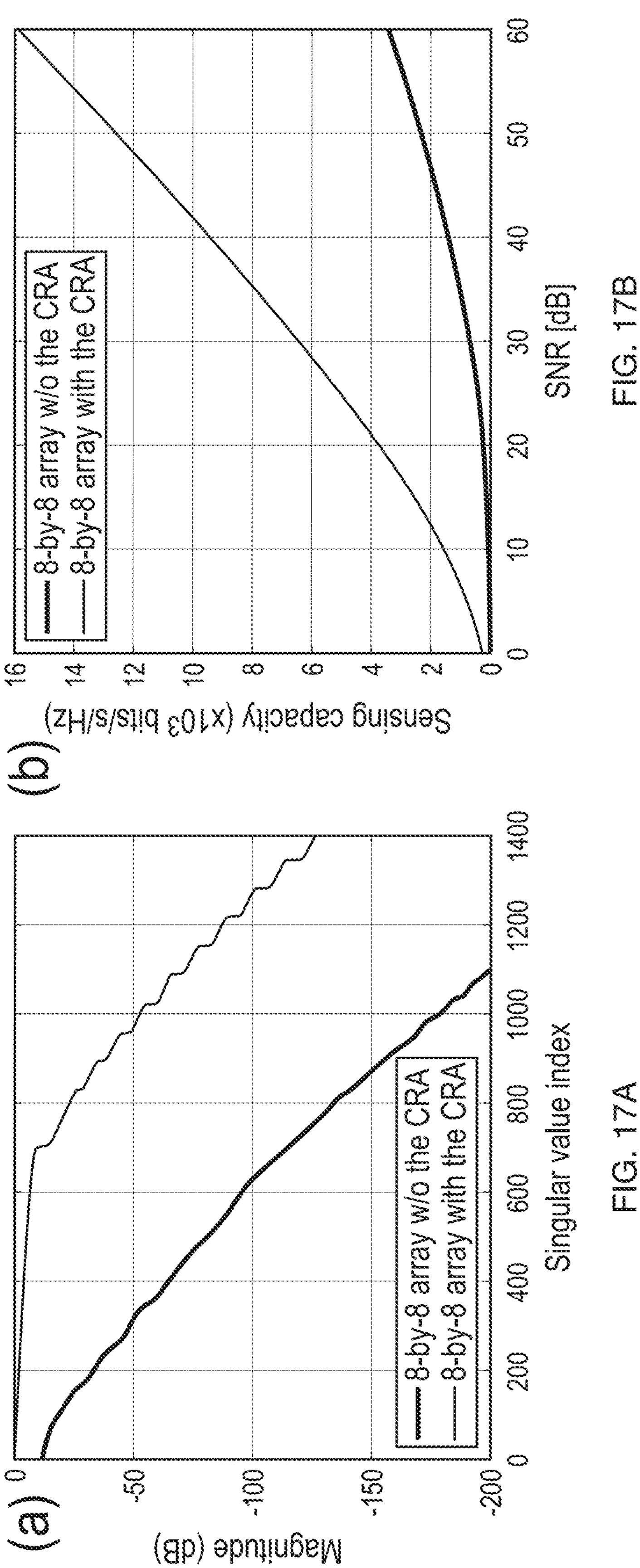
FIG. 17A shows the singular value distributions of an 8-by-8 array with and without the CRA.
FIG. 17B shows the corresponding sensing capacities where a significant capacity enhancement is achieved by the using CRA.

Note that equations (48) and (49) can be generalized in the multi-CRA case where the computed sensing matrices for all the combinations of the $i^{th}$ Tx array and $j^{th}$ Rx array, $\forall$i,j$\in$[1, $N_0$], need to be computed and reshaped to match with the format of equation (46) for the image formation. To validate the sensing capacity enhancement by the CRA-based spatial coding, a basic simulation is performed by using a 0.5 m-by-0.5 m CRA fed by an 8-by-8 square array, where the sensing capacity is interpreted by the Shannon formation theorem, namely $$C = \sum_{i=1}^{N_{min}} \log_2\left(1 + \frac{P_i \lambda_i^2}{\delta_0^2}\right) \tag{50}$$

where $P_i$ is the transmitted power of the $i^{th}$ channel, $$\lambda_i^2$$

is the transfer gain of the $i^{th}$ channel, $\lambda_i$ being the channel's singular value, $$\delta_0^2$$

is the variance of the thermal noise, and $N_{min}=\min\{N_g, N_p\}$ is the number of effective channels. In the simulation, $N_f=100$ frequencies are uniformly selected from 81.67 GHz to 86.69 GHz. The wavelength $\lambda_c$ at the center frequency $f_c$ is 3.6 mm, and the range resolution $\delta_y$ is $c_0/(2B)=3.0$ cm. The RoI is located at 1.7 m in front of the CRA, which has the dimensions of 216 mm, 300 mm, and 216 mm in the x-, y-, and z-axes, respectively. The discretization resolution of the RoI is $2\lambda_c$, $\delta y$, $2\lambda_c$, in the x-, y-, and z-axis, respectively. FIG. 17A shows the singular value distributions of the 8-by-8 array with and without the CRA, where the use of the CRA shows a more fattened singular value distribution, namely a larger number of effective channels $N_{min}$ for a higher sensing capacity. FIG. 17B shows the corresponding sensing capacities where a significant capacity enhancement is achieved by the using CRA. Additionally, the CRA can provide a higher antenna gain to help achieve larger singular values for a higher receiving SNR.

In order to perform the 4-D imaging of on-the-move objects, the matched filter in equation (47) needs to be revised to take the object motion induced phase error into consideration. Assuming the object velocity is v and $N_1$ STC loops are transmitted, the phase error $\Delta\phi$ between successive STC loops at each frequency f will be:

$$\Delta\varphi = \frac{4\pi f v}{c_0}\Delta t, \tag{51}$$

where $\Delta t=N_c T_c$ is the duration time of each STC loop consisting Ne chirps. Therefore, the velocity estimation can be done by the following 1-D inverse discrete FT (IDFT), $$\hat{G} = IDFT_{1D}\{[g_1, g_2, \ldots, g_{N_l}]\} \tag{52}$$

where $g_{n_l}$, $n_l \in [1, N_l]$, is the measurement vector at the $n_l^{th}$ STC loop, and $IDFT_{ID}\{\bullet\}$ is the 1-D IDFT operation along the dimension of the STC loops at the same frequency f. Thus, the maximum likelihood estimation of the 1-D object velocity v can be computed by $$\hat{n}_l = \arg\max_{n_l \in [1, N_l]} \{|\hat{g}_{n_l}|\} \tag{53}$$

$$\hat{v} = \frac{c_0}{2fN_tT_c}\left(\frac{\hat{n}_l - 1}{N_l} - \frac{1}{2}\right)$$

where $|\bullet|$ is the vector norm, $\hat{g}_{n_l}$ is the $n_l^{th}$ column of $\hat{G}$, $\hat{v}$ is the estimated object moving velocity, and the maximum unambiguous velocity is $+/-c_0=(4fN_tT_c)$. Thus, the 3-D object profile based on a single STC loop can be reconstructed by $$u = A^{\dagger}\Lambda g \tag{54}$$

where $\Lambda$ is the diagonal matrix for the motion compensation under the estimated object velocity $\hat{v}$, and the diagonal entry of $\Lambda$ is defined as follows:

$$A_{n_t,n_r,n_f} = e^{j4\pi(n_t-1)f\hat{v}T_c/c_0}. \tag{55}$$

To evaluate the imaging resolution of the CRA imaging system, the point spreading function (PSF) is simulated. FIG. 18A shows a basic simulation setup with the 0.5 m-by-0.5 m CRA fed by the 8-by-8 MIMO array where the element separation is 9.0 mm. FIG. 18B shows a more advanced simulation setup by stacking two 1.0 m-by-1.0 m CRAs in a multistatic configuration where each CRA is fed by the 16-by-16 MIMO array with an element separation of 4.5 mm. Both the 8-by-8 and 16-by-16 MIMO arrays have a same physical MIMO aperture size of 36 mm-by-36 mm. FIG. 18C shows the simulated PSF of the 0.5 m-by-0.5 m CRA fed by the 8-by-8 array, where the 3-dB widths of the focusing are $\delta_x=18.7$ mm and $\delta_z=20.0$ mm along the x- and z-axis, respectively. FIG. 18D shows the PSF of the 1.0 m-by-1.0 m CRA fed by the 16-by-16 array, where the 3-dB widths of the beam focusing are $\delta_x=52.5$ mm and $\delta_z=52.5$ mm along the x- and z-axis, respectively. FIG. 18E shows the simulated performance to image a human-size array of points using the setup in FIG. 18B. Note that both setups in FIGS. 18A and 18B share the same system concept, signal model, and imaging theory except for the configurations the CRAs and the SDMMW MIMO arrays.

Considering the positioning errors of the MIMO arrays and the CRAs exist even under the laser-aided alignment, and the Tx and Rx chains can suffer from different transfer functions, a system-level calibration is required for the coherent MIMO operation. Note that the calibration is only done once at the startup of the imaging system. In this work, the calibration is performed based on the simulated and measured frequency responses of an easily characterized object, such a non-moving corner reflector or a metallic sphere, namely $$\overline{g} = (g - g_{BG}) \cdot \left(\frac{g_{C-SIM}}{g_{C-EXP} - g_{BG}}\right) \tag{56}$$

where $g_{BG}$ is the background measurement in the absence of any object in front of the radar; $g_{C-EXP}$ is the measured response of the calibrator in front of the MIMO aperture; $g_{C-SIM}$ is the PO simulated response of the same calibrator; (•/•) is the element-wise division operation to measure and compensate the system-level magnitude and phase errors for all the Tx and Rx channels at all frequencies; g is the raw measurement vector before the calibration; and $\tilde{g}$ is the calibrated measurement vector for the imaging reconstruction.

An example simulation setup is shown in FIG. 19A. The RoI is located at [0.8; 1.7; 1.2]m, which consists of three plane cuts along x-y, x-z, and y-z, respectively, having a same size of 216 mm-by-216 mm. The CRA center is located at [0.8; 0.0; 1.2]m, and the MIMO array is centered at the focal point of the CRA. Considering the laser-aided alignment which are shown in FIG. 20, the MIMO array can still suffer from the misalignment errors including the elevation tilt $\Delta\theta$, the azimuthal tilt $\Delta\phi$, and the range shift $\Delta d$ along the laser path from the CRA center to the focal point, namely the y'-axis. As the first step, $g_{C\text{-}SIM}$ (without positioning errors) and $g_{C\text{-}EXP}$ (with simulated positioning errors) are simulated and saved, where a point calibrator is located at [0.8; 2.0; 1.2]m. The positioning errors are selected to be $\Delta\theta=5°$, $\phi\Delta=5°$ and $\Delta d=10$ mm. To validate the effectiveness of the calibration method, the PSF in the RoI is simulated. FIGS. 19B and 19C show the simulated PSFs before and after the calibration, respectively, showing that calibration results in a well-focused PSF.

Figure 20A:
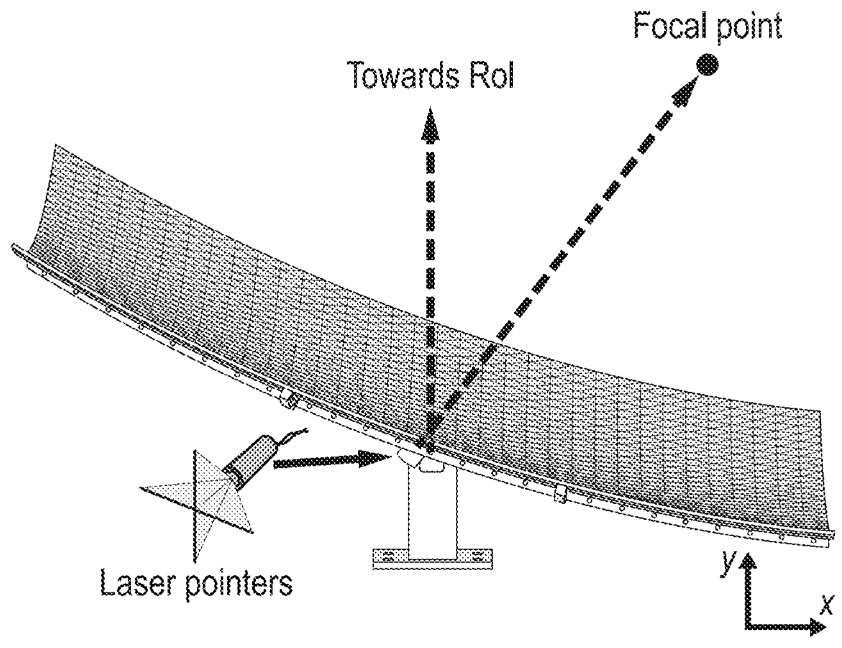
FIG. 20A shows that the geometrical profile of the CRA is modeled by the metallic triangle units with pseudo-random tilts.
Figure 20B:
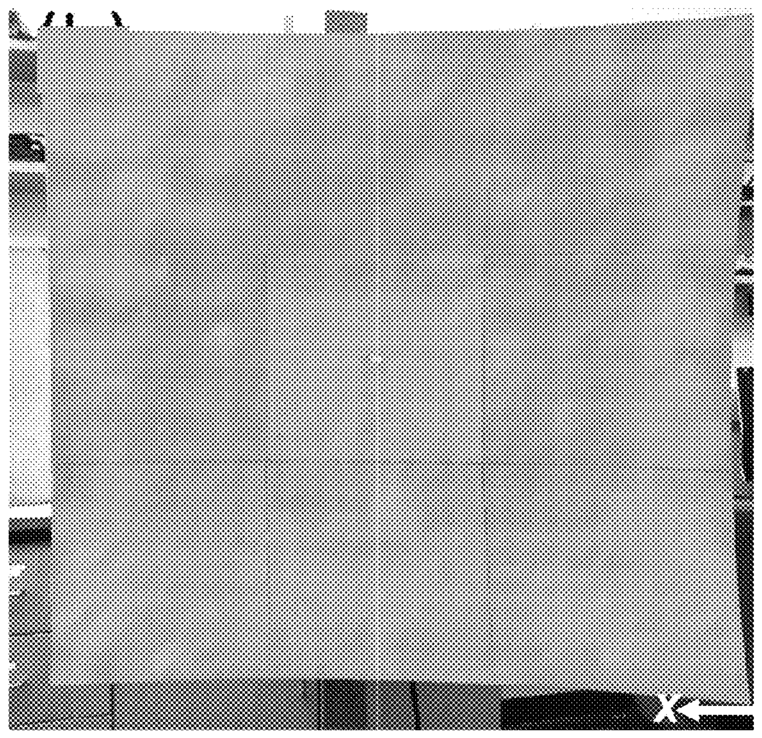
FIG. 20B shows the fabricated CRA.

As shown in FIG. 20A, the geometrical profile of the CRA is modeled by the metallic triangle units with pseudo-random tilts. The CRA has a rectangular aperture of 500 mm-by-500 mm. The CRA center contains two hollow cylindrical structures with a co-aperture that has a diameter of 9 mm, where two laser pointers are fixed to create two laser beams towards the RoI and the focal point, respectively. Thus, the alignment errors of the SDMMW MIMO array and the CRA can be minimized. The CRA is 3-D printed using the plastic material acrylonitrile butadiene styrene (ABS), followed by the silver coating on the CRA front surface. FIG. 20B shows the fabricated CRA.

Figure 21A:
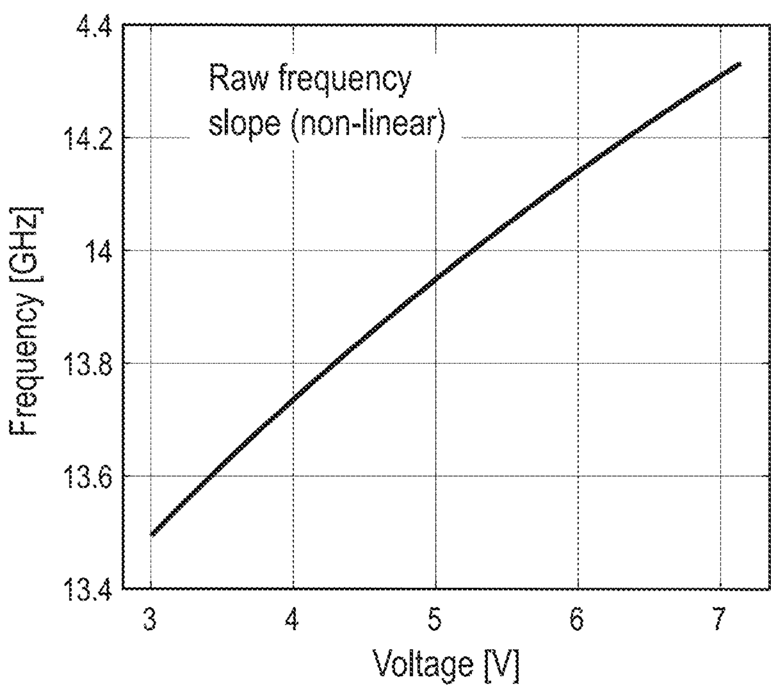
FIG. 21A shows the raw measurement of the non-linear frequency f as a function of the input voltage V.
Figure 21B:
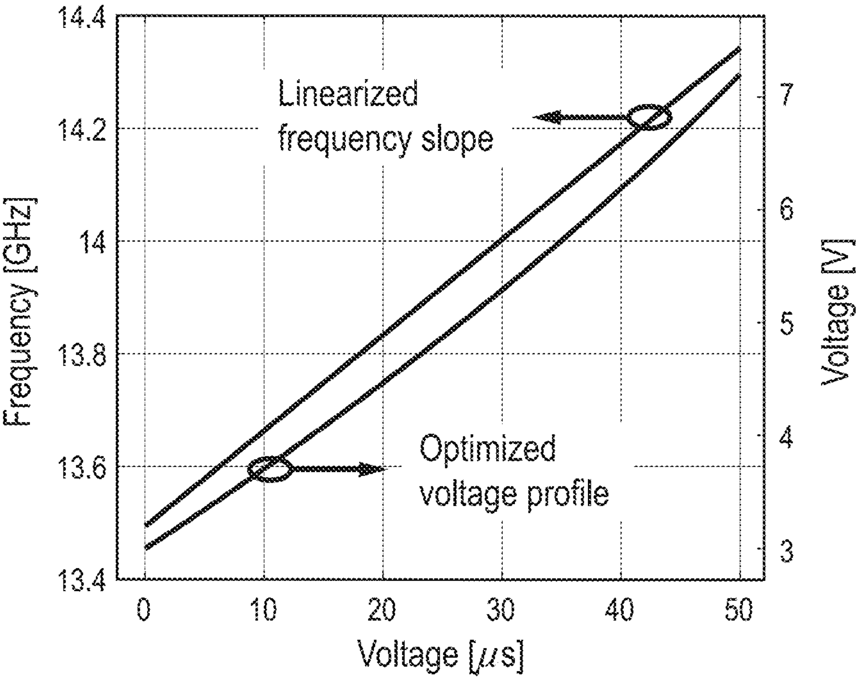
FIG. 21B shows a sweep of an optimized voltage profile.

The design of the 8-by-8 SDMMW feeding array uses most of the hardware modules as described herein, using fast FMCW modulation facilitated by a commercial low-cost VCO module which is the basis to enable the on-the-move objects imaging. It is common that non-linear frequency response vs. linear voltage input exists in commercial VCO modules. FIG. 21A shows the raw measurement of the non-linear frequency f as a function of the input voltage V, i.e., f=g(V). To achieve a good ranging focusing, a linearized frequency sweep vs. time is desired, which requires an optimized voltage profile, usually non-linear, as the input to the VCO. The optimized voltage profile can be obtained from the measured raw frequency curve by using the following inverse mapping, $$\hat{V} = g^{-1}(\hat{f})(f) \tag{57}$$

where $g^{-1}$ is the inverse function of g that is the raw frequency response vs. the input voltage, as measured in FIG. 21A, $\hat{f}$ is the desired linearized frequency response, and $\hat{V}$ is the optimized voltage profile as the input to the VCO. As shown in FIG. 21B, the optimized voltage profile sweeps from 3.00V to 7.16V, which corresponds to the linearized FMCW frequency slope from 13.495 GHz to 14.332 GHz, within 50.0 μs. Considering the ×6 multipliers of the upconverters/downconverters and the 700 MHz RF carrier of the SDRs, the mm-wave frequency eventually goes from 81.67 GHz to 86.69 GHz within 50:0 μs, providing a maximum unambiguous velocity of $+/-c_0=(4fcNtTc)=+/-2{:}23$ m/s, $f_c=84.18$ GHz being the center frequency of the mm-wave FMCW. The baseband sampling rate of the SDRs is $f_s=4$ MHz, and thus the total number of frequencies being used is $N_f=T_c\times f_s=200$.

The raw data acquisition time of a single STC loop is $N_t\times T_c=400$ μs, corresponding to an raw data acquisition rate of 2500 volumetric fps. In the example embodiment, the matched filter and the sensing matrix can be pre-computed and stored in the random access memory (RAM) of the host computer (in this case a laptop with an i7-9750H CPU). Image reconstruction takes ~60 ms for solving total $N_p=8405$ unknown pixels in the RoI. Using a much more powerful host computer with GPUs and more threads, the image reconstruction time may be reduced to a negligible amount compared to the STC loop time of 400 μs, and the image formation rate can eventually approach the raw data acquisition rate of 2500 pfs.

Figures 22, 23:
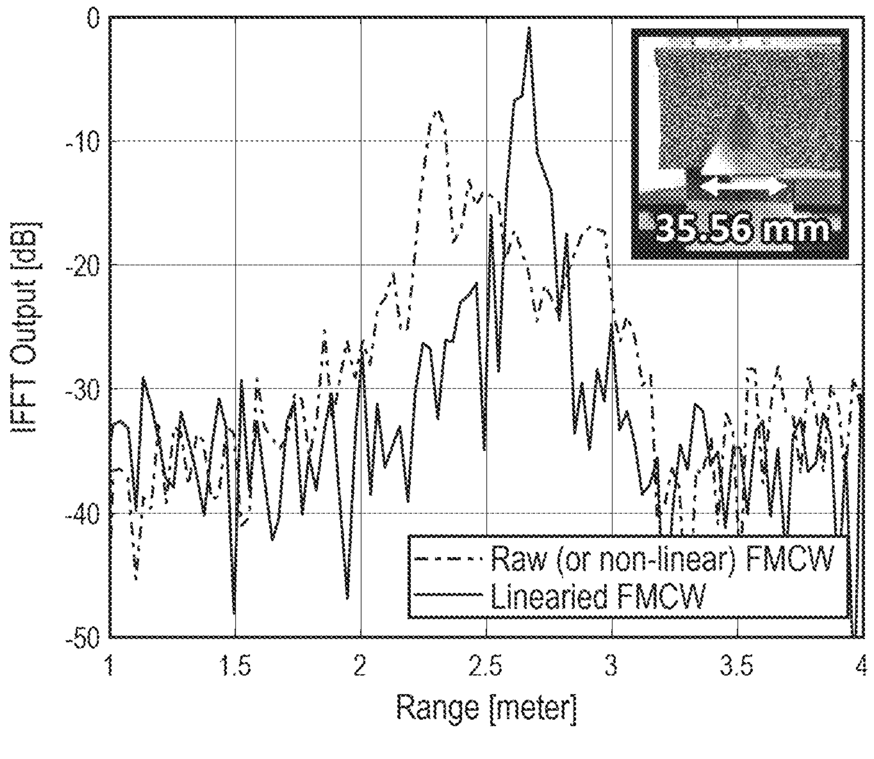
FIG. 22 shows a range profile from the linearized FMCW.
FIG. 23 shows a setup for the 4-D imaging of an on-the-move L-shaped metallic object using an example embodiment of the invention.

To validate the ranging performance enhancement by the linearized FMCW modulation, the 1-D range measurements are performed, where a corner reflector with an edge length of 35.56 mm is the object under detection. As shown in FIG. 22, the range profile from the linearized FMCW has a much more focused response and a higher peak magnitude, while the range profile based on the raw (non-linear) FMCW shows an off-focused range profile which is spreading.

FIG. 23 shows the setup for the 4-D imaging of an on-the-move L-shaped metallic object 2302 using an example embodiment of the invention. The insert on the left shows the dimensions of the object, where the maximum and minimum dimensions are 112 cm and 32 cm, respectively. The insert on the right shows the configuration of the SDMMW MIMO array, which consists of 8 Txs and 8 Rxs, along the x-axis and the z-axis, respectively, forming total 64 synthetic measurement channels. Also, a linear actuator is used to provide the on-the-move capability for the L-shaped object 2302.

Figures 24A, 24B:
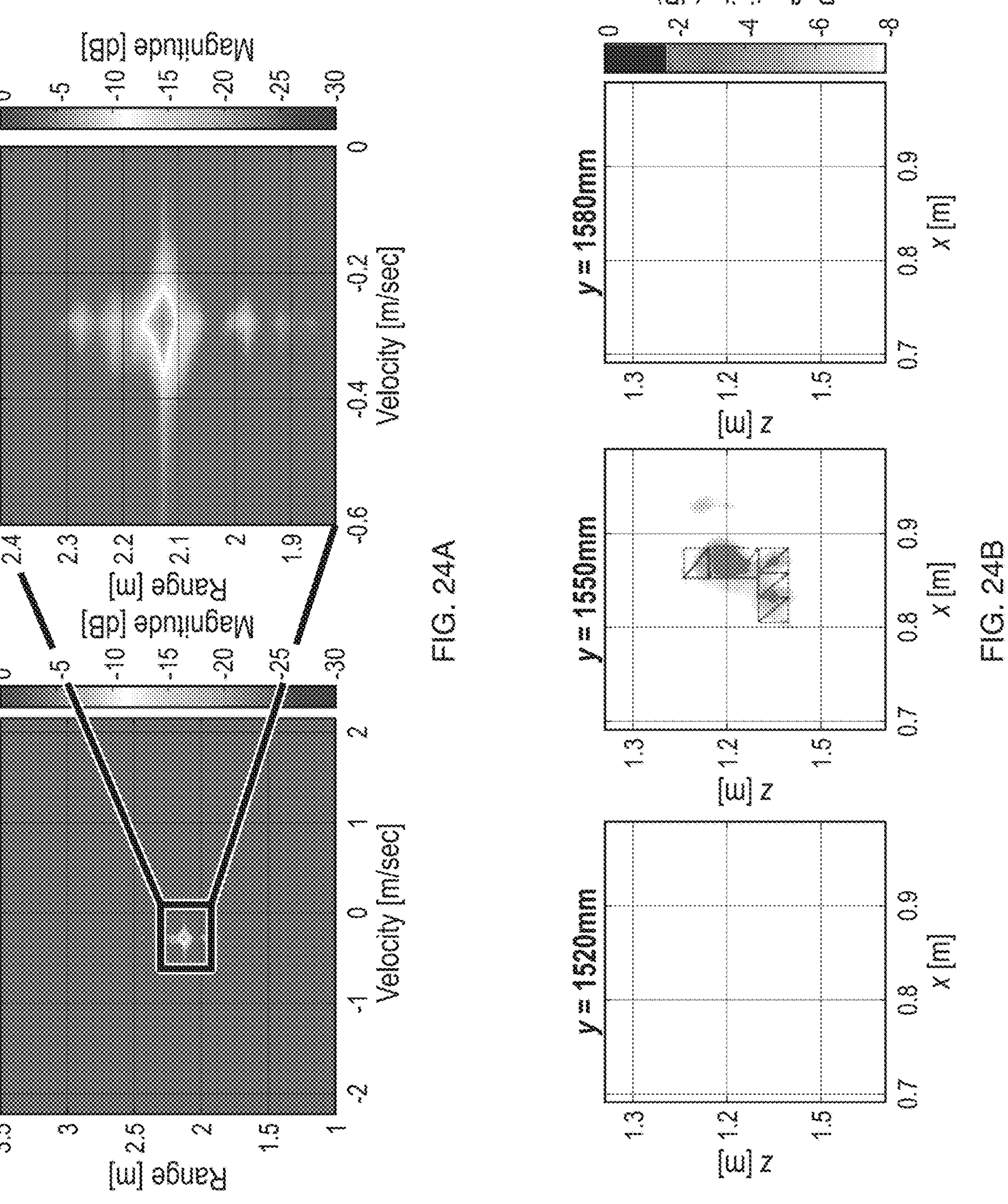
FIGS. 24A and 24B show the imaging results of the L-shaped object moving at 0.3 m/s towards to the CRA.
Figures 25A, 25B:
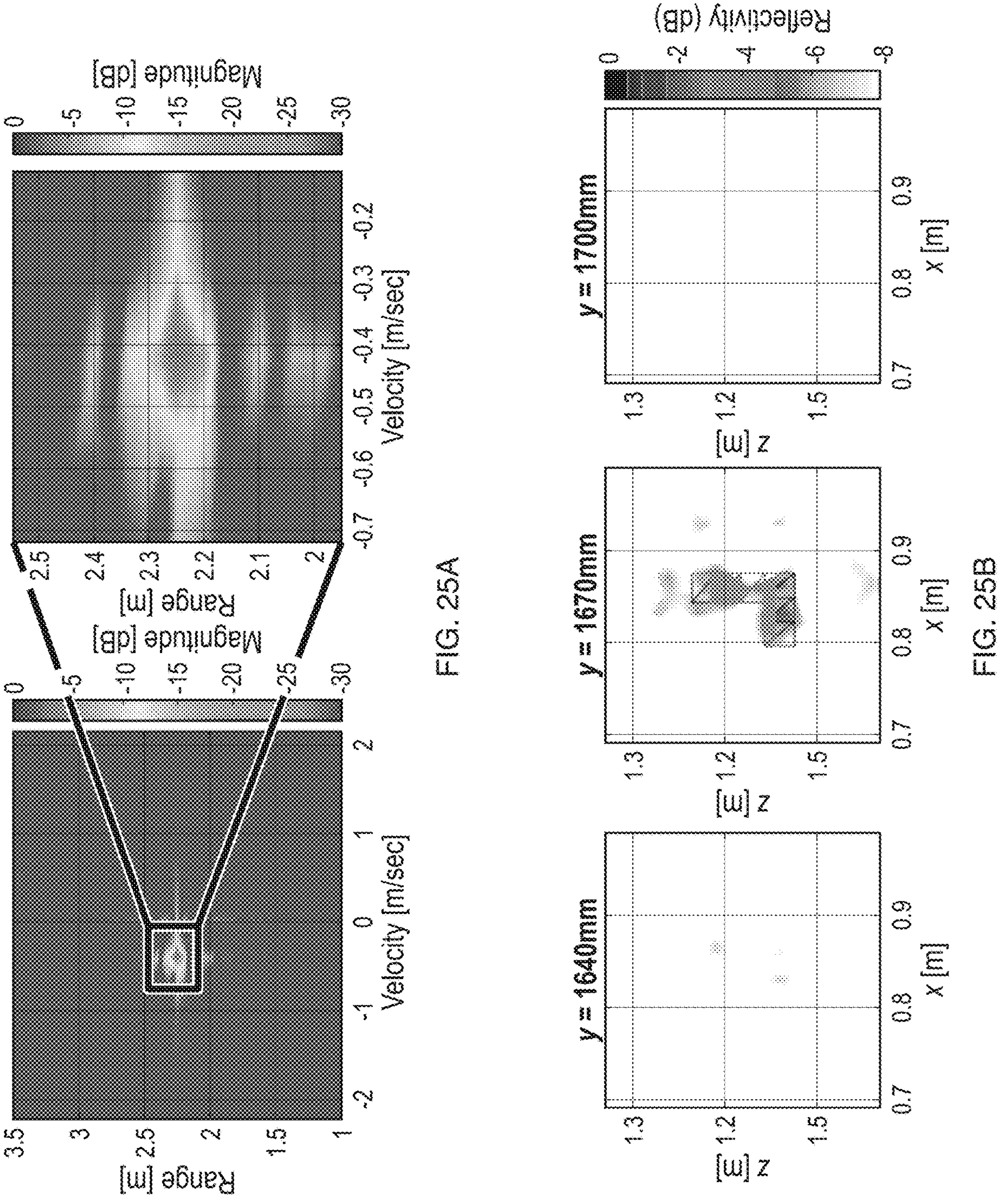
FIGS. 25A and 25B show the imaging results of the L-shaped object moving at 0.4 m/s towards to the CRA.

The imaging results of the L-shaped object 2302 moving at 0.3 m/s towards to the CRA 2304 are given in FIGS. 24A and 24B. FIG. 24A shows the range-Doppler measurement with $N_l=64$ STC chirp loops. The corresponding velocity resolution in FIG. 24A is $\Delta v=c_0=(2f_cN_tT_cN_l)=0.070$ m/s. FIG. 24B shows the corresponding 3-D reconstructed object profile based on one single STC chirp loop of 400 μs. Similarly, the imaging results of the L-shaped object moving at 0.4 m/s towards to the CRA 2304 are shown in FIGS. 25A and 25B, where the range-Doppler measurement with $N_l=32$ STC chirp loops is given in FIG. 25A and the 3-D reconstructed object profile is presented in FIG. 25B. The velocity resolution in FIG. 25A is $\Delta v=c_0=(2f_cN_tT_cN_l)=0.139$ m/s. FIGS. 24A, 24B, 25A, and 25B demonstrate good estimation accuracy on the object velocities, and the object profiles are well-imaged by comparing the reconstructed reflectivity to the ground truth mesh of the L-shaped object.

Figure 26A:
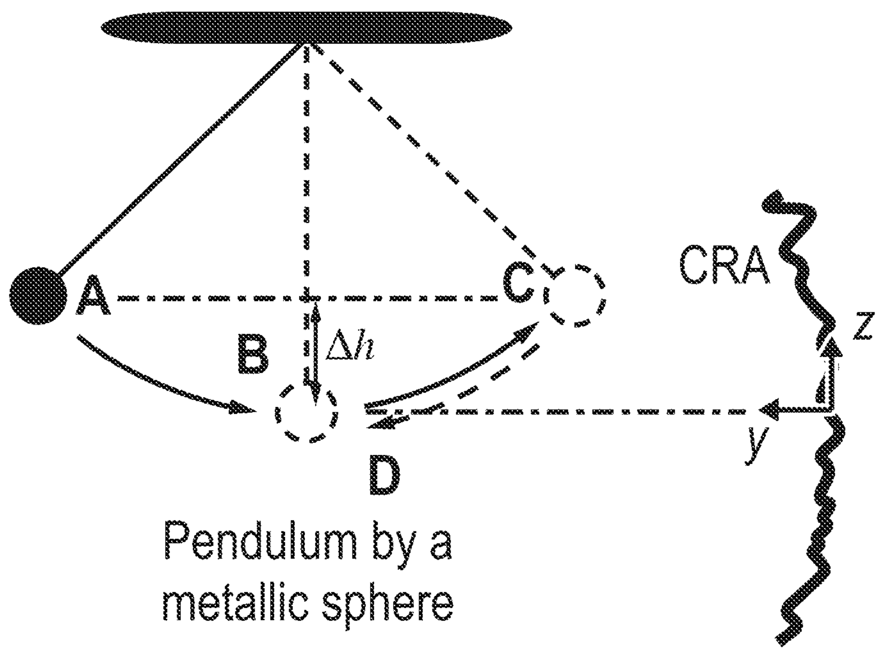
FIG. 26A illustrates a demonstration setup using a metallic sphere suspended as a pendulum.
Figure 26B:
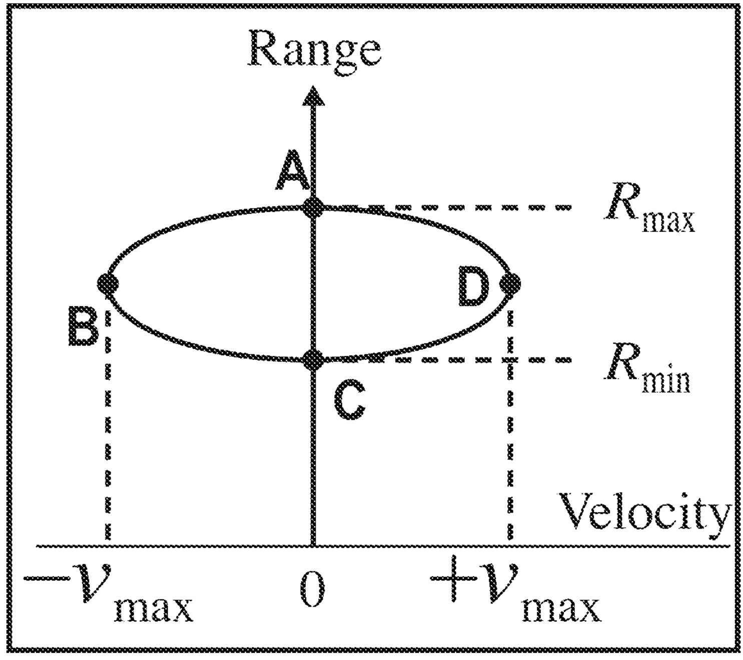
FIG. 26B shows the theoretical range-Doppler response associated with the pendulum shown in FIG. 26A.

Due to the limited velocity that can be provided by the linear actuator, which cannot go beyond normal human walking speed of 1.42 m/s, further imaging evaluations with faster moving velocities are performed. One easy and straightforward way is using the pendulum, as shown in FIG. 26A, where a metallic sphere is hanging as the object under detection. There will exist four motion states: 1) the state A has the maximum range, $R_{max}$, and zero velocity; 2) the state B has the medium range, $(R_{max}+R_{min})/2$, and negative maximum velocity, $-v_{max}$; 3) the state C has the minimum range, $R_{min}$ and zero velocity; and 4) the state D has the medium range, $(R_{max}+R_{min})/2$, and positive maximum velocity, $+v_{max}$. Thus, the corresponding range-Doppler response in theory will be in an ellipse curvature, as plotted in FIG. 26B. According to the law of conservation of energy, the absolute maximum velocity is $v_{max}=\sqrt{2g\Delta h}$, where g is the frictionless acceleration of gravity and Δh is the elevation difference between the state A and the state B. Thus, a moderate Δh=0.3 m can give rise to a large enough maximum velocity of $v_{max}>2.0$ m/s.

Figure 27A:
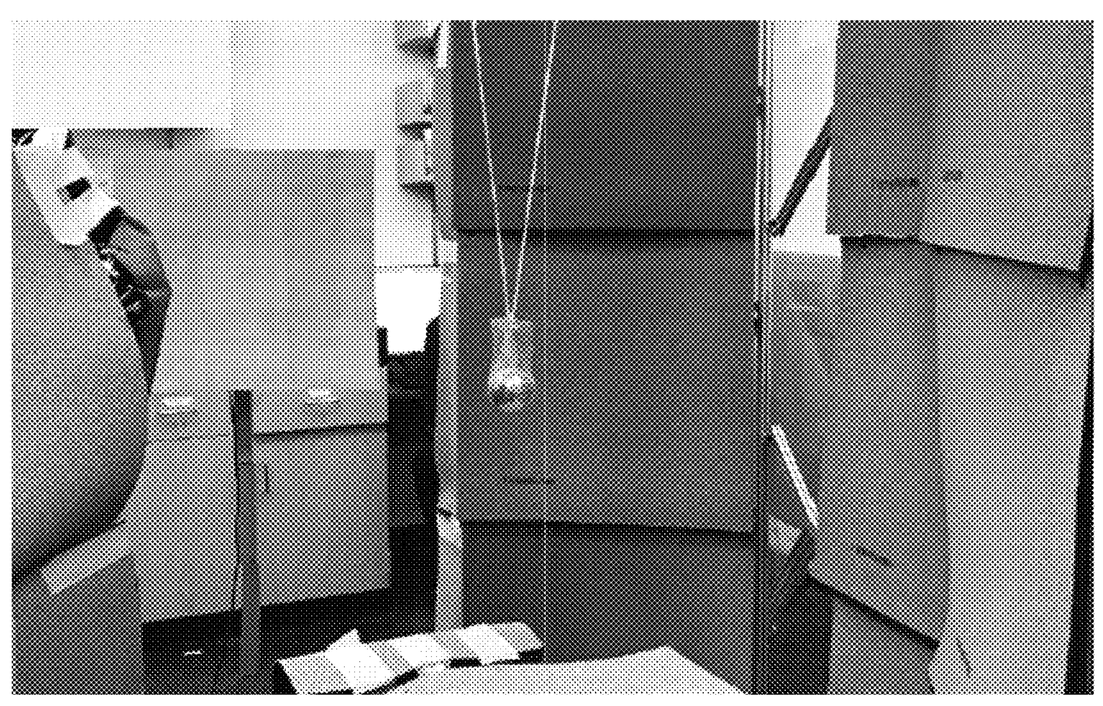
FIGS. 27A and 27B show an actual demonstration setup using a metallic sphere suspended as a pendulum.
Figure 27B:
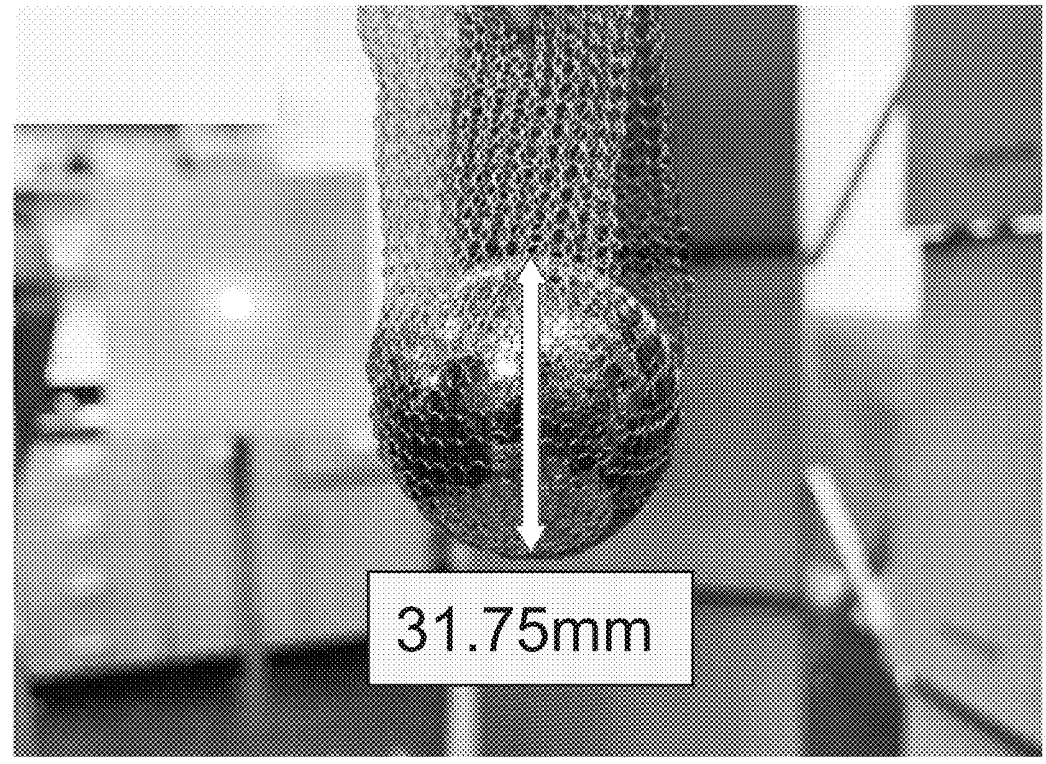
Figures 28A, 28B, 28C, 28D:
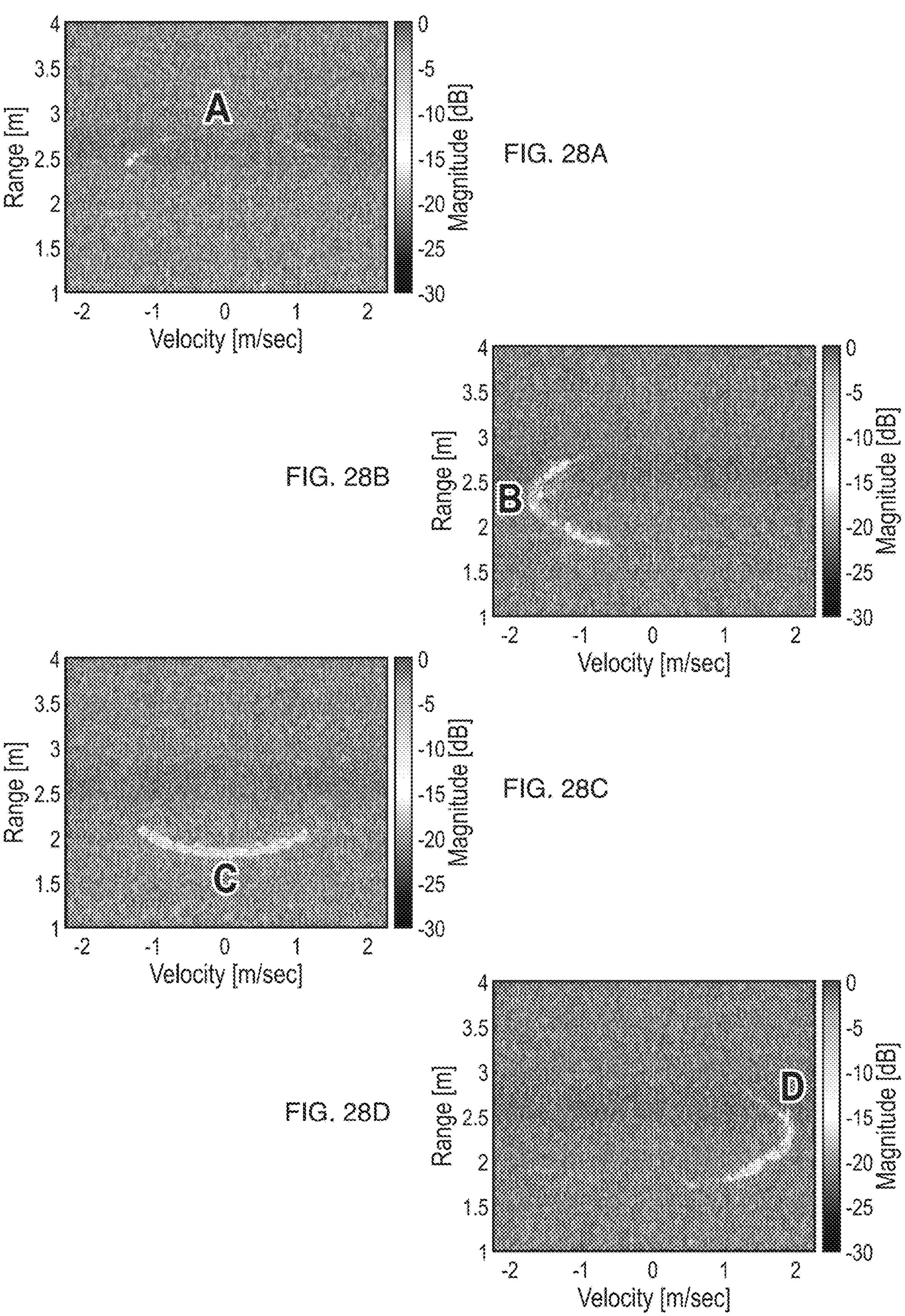
FIGS. 28A-28D illustrate the measured range-Doppler profiles for the various motion states of the pendulum.

The setup on the pendulum with a metallic sphere is shown in FIGS. 27A and 27B, where the sphere is shown to have a diameter of 31.75 mm. In each range-Doppler measurement, total $N_l=2048$ STC chirp loops are transmitted and received, which results in an overall data acquisition period of 2048×400 μs=819.2 ms. Since this 819.2 ms is shorter than the period of the pendulum in the experimental setup, multiple independent range-Doppler measurements are carried out to include all the four motion states. The measured range-Doppler profiles for the motion states A, B, C, and D are shown in FIGS. 28A, 28B, 28C, and 28D, respectively, which match with the theoretical prediction given in FIG. 26B. Note that the motion state A in FIG. 28A has a relatively weak magnitude response since it is near the furthest range and the highest elevation, exposed to the least electromagnetic radiation. The motion state B is the most relevant, because it corresponds to the most common imaging scenario where a human body is facing and moving towards the imaging system.

Figure 29A:
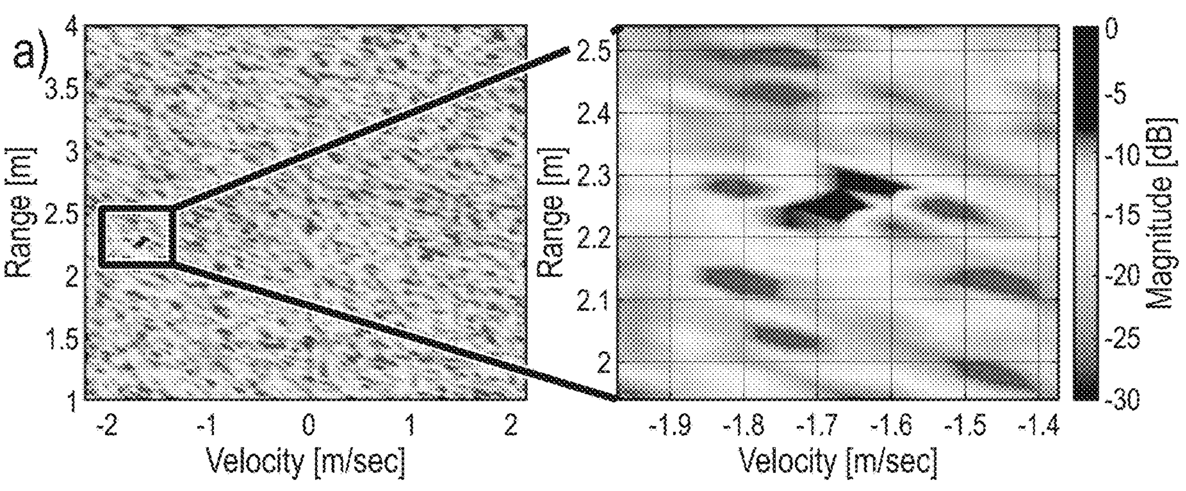
FIG. 29A shows the local range-Doppler measurement of the pendulum sphere near the motion state B.
Figure 29B:
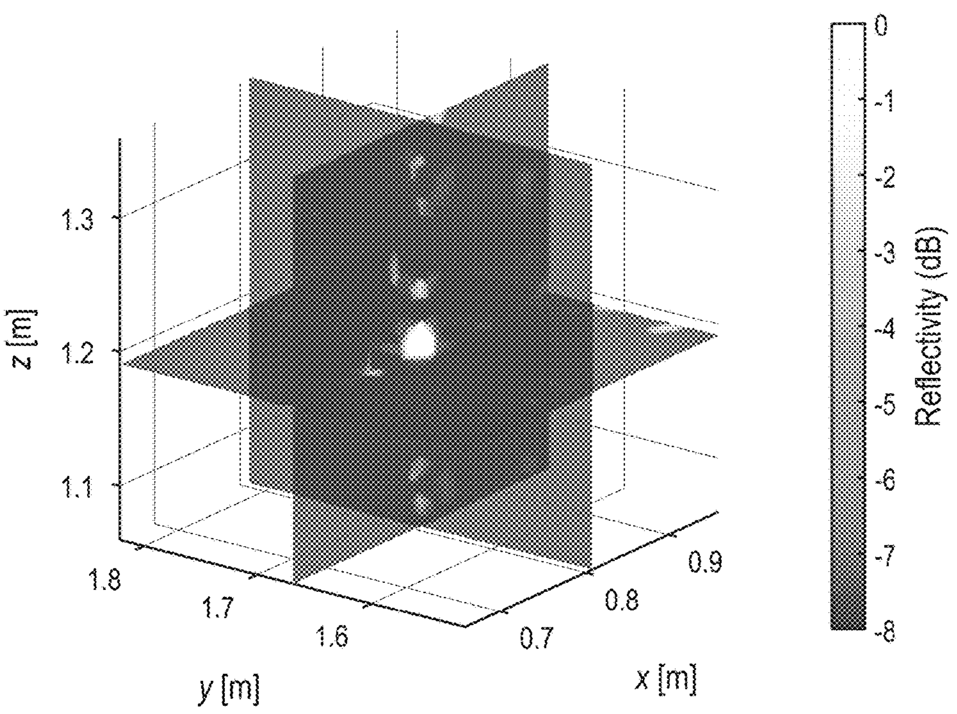
FIG. 29B shows the imaged sphere profile in the x-y, x-z and y-z planes.

FIG. 29A shows the local range-Doppler measurement of the pendulum sphere near the motion state B by using $N_l=64$ STC chirp loops, which ensures the object is moving faster than normal human walking speed of 1.42 m/s. The 3-D object profile reconstruction based on a single STC loop of 400 μs after the motion compensation is given in FIG. 29B which shows the imaged sphere profile in the x-y, x-z and y-z planes. The PSF-like profile validates the effectiveness of the CRA-based SDMMW MIMO system for imaging of fast moving objects.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

Figure 30:
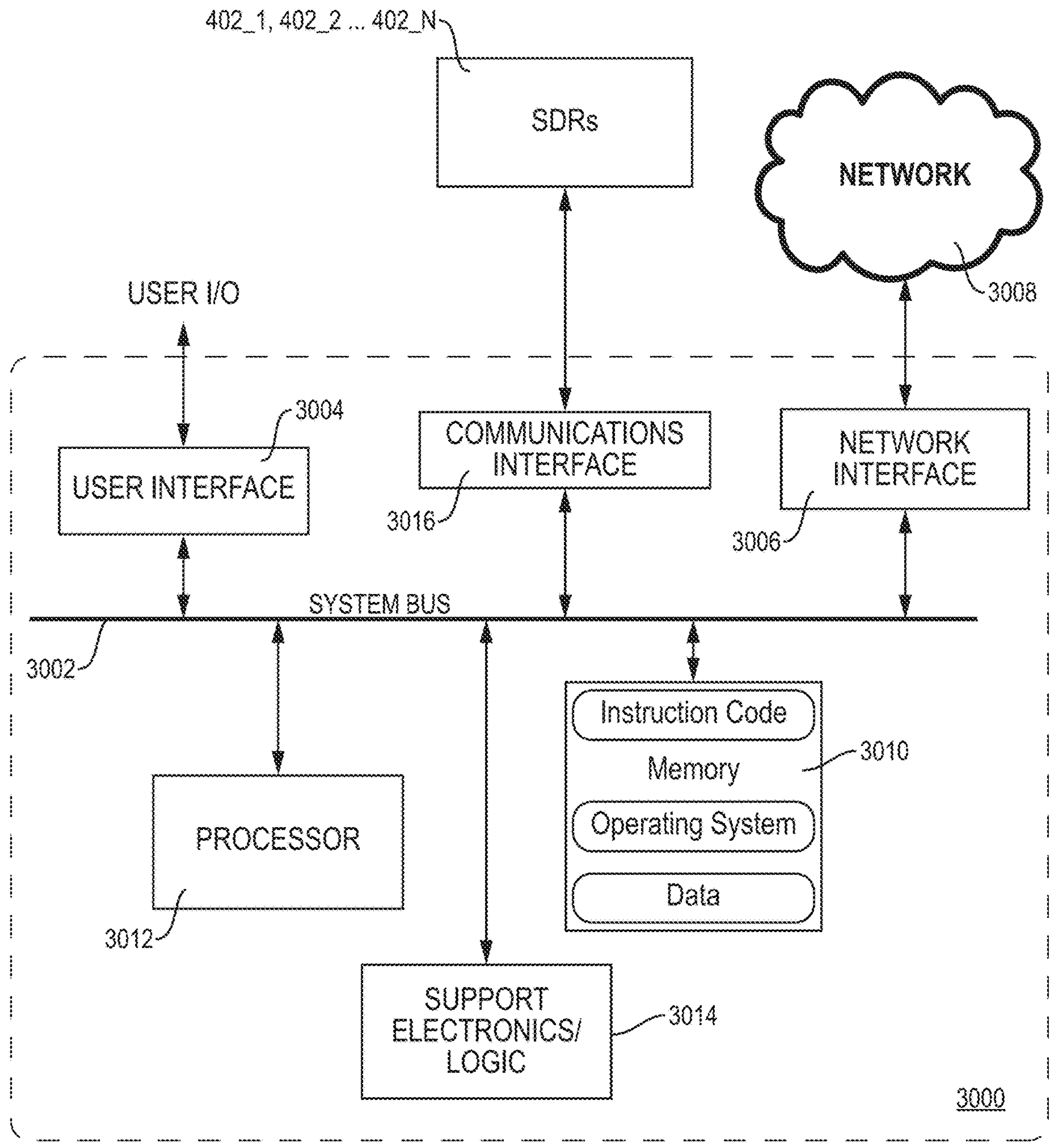
FIG. 30 shows an example internal structure of a processing system that may be used to implement one or more of the embodiments herein.

FIG. 30 is a diagram of an example internal structure of a processing system 3000 that may be used to implement one or more of the embodiments herein. Each processing system 3000 contains a system bus 3002, where a bus is a set of hardware lines used for data transfer among the components of a computer or processing system. The system bus 3002 is essentially a shared conduit that connects different components of a processing system (e.g., processor, disk storage, memory, input/output ports, network ports, etc.) that enables the transfer of information between the components.

Attached to the system bus 3002 is a user I/O device interface 3004 for connecting various input and output devices (e.g., keyboard, mouse, displays, printers, speakers, etc.) to the processing system 3000. A network interface 3006 allows the computer to connect to various other devices attached to a network 3008. Memory 3010 provides volatile and non-volatile storage for information such as computer software instructions used to implement one or more of the embodiments of the present invention described herein, for data generated internally and for data received from sources external to the processing system 3000.

A central processor unit 3012 is also attached to the system bus 3002 and provides for the execution of computer instructions stored in memory 3010. The system may also include support electronics/logic 3014, and a communications interface 3016. The communications interface 3016 may be used to facilitate a communications path to and from, for example, the software defined radios 402_1, 402_2 . . . 402_N, as shown and described with respect to FIG. 4.

In one embodiment, the information stored in memory 3010 may comprise a computer program product, such that the memory 3010 may comprise a non-transitory computer-readable medium (e.g., a removable storage medium such as one or more solid state drives (SSDs), DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A multiple-input-multiple-output (MIMO) radar system, comprising:

two or more software-defined millimeter-wave (SDMMW) nodes;

a host processing system electrically coupled to the two or more SDMMW nodes;

a MIMO aperture array coupled to the two or more SDMMW nodes;

the MIMO radar system forming a MIMO transmit (TX) channel and a MIMO receive (RX) channel for each of the two or more SDMMW nodes.

2. The MIMO radar system of claim 1, further comprising:

a millimeter wave (MMW) frequency-modulated continuous wave (FMCW) oscillator source configured to generate a MMW FMCW signal; and for each of the two or more SDMMW nodes:

an upconverter assembly configured to receive a transmit (TX) intermediate frequency (IF) signal from the SDMMW node, convert the TX IF signal to a TX millimeter wave (MMW) signal using the MMW FMCW signal, and provide the TX MMW signal to the MIMO array;

a downconverter assembly configured to receive a receive (RX) MMW signal from the MIMO array, convert the RX MMW signal to an RX IF signal using the MMW FMCW signal, and provide the RX IF signal to the SDMMW node.

3. The MIMO radar system of claim 2, wherein the MMW FMCW oscillator source coherently distributes the MMW FMCW signal to each of the two or more SDMMW nodes.

4. The MIMO radar system of claim 2, wherein the MMW FMCW oscillator source sweeps the MMW FMCW signal across a range of frequencies.

5. The MIMO radar system of claim 4, wherein the range of frequencies is continuous.

6. The MIMO radar system of claim 4, wherein the range of frequencies comprises discrete steps.

7. The MIMO radar system of claim 1, wherein each of the two or more SDMMW nodes implements an orthogonal frequency-division multiplexing (OFDM) waveform.

8. The MIMO radar system of claim 1, wherein each of the two or more SDMMW nodes implements space-time coding.

9. The MIMO radar system of claim 1, wherein each of the two or more SDMMW nodes implements transmission and reception digital beamforming.

10. The MIMO radar system of claim 1, wherein the host processing system comprises:

a processor; and a memory with computer code instructions stored thereon, the memory operatively coupled to the processor such that, when executed by the processor, the computer code instructions cause the host processing system to:

modulate/demodulate one or more digital baseband waveforms in a transmission/reception mode; and perform imaging reconstruction of information received through a receive channel to visualize targets in 3D.

11. The MIMO radar system of claim 1, wherein the two or more software-defined millimeter-wave (SDMMW) nodes are configured to operate in a transmission mode and a receive mode.

12. The MIMO radar system of claim 1, further comprising a compressive reflector antenna (CRA) constructed and arranged to (i) reflect a transmit MMW signal, radiated by the MIMO array, towards a target, and (ii) reflect a receive MMW signal, radiated by the target, towards the MIMO array.

13. The MIMO radar system of claim 12, further comprising at least one additional CRA constructed and arranged to reflect the transmit MMW signal and to reflect the receive MMW signal.

14. The MIMO radar system of claim 1, further comprising a clock distributer module that (i) distributes a frequency reference to the two or more SDMMW nodes, the MMW FMCW oscillator source, and the host processor, and (ii) distributes a timing reference to the two or more SDMMW nodes, the MMW FMCW oscillator source, and the host processor.

15. The MIMO radar system of claim 14, wherein the timing source (i) triggers the MMW FMCW oscillator source to sweep the MMW FMCW signal across a range of frequencies, and (ii) triggers the two or more SDMMW nodes to begin data streaming in all transmit (TX) and receive (RX) channels.

16. The MIMO radar system of claim 15, wherein the data streaming comprises, at each of a set of MMW FMCW signal frequencies across the range of frequencies, a transmission of orthogonal binary phase coding (BPC) on the orthogonal frequency-division multiplexing (OFDM) symbol sequences.

17. The MIMO radar system of claim 1, wherein the MIMO radar system is calibrated by a measurement of, and a compensation of, phase and magnitude errors in each of the MIMO TX channels and MIMO RX channels.

18. The MIMO radar system of claim 17, wherein measurement of and a compensation of phase and magnitude errors is performed using a calibrated measurement vector $$\tilde{g} = (g - g_{BG}) \cdot \left( \frac{g_{C-SIM}}{g_{C-\mathrm{EXP}} - g_{BG}} \right),$$

where $g_{BG}$ is a background measurement absent any object in front of the radar system, $g_{C\text{-}EXP}$ is a measured response at a far-field of the MIMO array, $g_{C\text{-}SIM}$ is a simulated response of the radar system, and g is any raw measurement vector before calibration.

19. The MIMO radar system of claim 1, wherein each of the two or more SDMMW nodes uses coding on an orthogonal frequency-division multiplexing (OFDM) waveform, with distinct coding applied to each TX path, to distinguish data returning on each RX path.

20. The MIMO radar system of claim 19, wherein the coding is space-time coding (STC).

* * * * *